US010073656B2

(12) United States Patent
Zhe Yang et al.

(10) Patent No.: US 10,073,656 B2
(45) Date of Patent: Sep. 11, 2018

(54) SYSTEMS AND METHODS FOR STORAGE VIRTUALIZATION

(71) Applicant: SanDisk Technologies LLC, Plano, TX (US)

(72) Inventors: Jerene Zhe Yang, San Jose, CA (US); Yang Luan, San Jose, CA (US); Brent Lim Tze Hao, San Jose, CA (US); Vikram Joshi, Los Gatos, CA (US); Michael Brown, Campbell, CA (US); Prashanth Radhakrishnan, Sunnyvale, CA (US); David Flynn, Sandy, UT (US); Bhavesh Mehta, Sunnyvale, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 0 days.

(21) Appl. No.: 14/245,893

(22) Filed: Apr. 4, 2014

(65) Prior Publication Data

US 2014/0223096 A1    Aug. 7, 2014

Related U.S. Application Data

(63) Continuation-in-part of application No. 13/750,904, filed on Jan. 25, 2013, now Pat. No. 9,116,812, and a
(Continued)

(51) Int. Cl.
*G06F 3/06* (2006.01)
*G06F 12/0871* (2016.01)

(52) U.S. Cl.
CPC .......... *G06F 3/0665* (2013.01); *G06F 3/0619* (2013.01); *G06F 3/0689* (2013.01); *G06F 12/0871* (2013.01); *G06F 2212/151* (2013.01)

(58) Field of Classification Search
None
See application file for complete search history.

(56) References Cited

U.S. PATENT DOCUMENTS

| 5,392,244 A | 2/1995 | Jacobson et al. |
| 6,986,015 B2 | 1/2006 | Testardi |

(Continued)

FOREIGN PATENT DOCUMENTS

| CA | 2761553 | 6/2013 |
| EP | 1582971 | 10/2005 |

(Continued)

OTHER PUBLICATIONS

USPTO, Office Action for U.S. Appl. No. 14/262,581 dated Jun. 19, 2014.
(Continued)

*Primary Examiner* — Jared I Rutz
*Assistant Examiner* — Charles J Choi
(74) *Attorney, Agent, or Firm* — Kunzler, PC

(57) ABSTRACT

An I/O manager may be configured to service I/O requests pertaining to ephemeral data of a virtual machine using a storage device that is separate from and/or independent of a primary storage resource to which the I/O request is directed. Ephemeral data may be removed from ephemeral storage in response to a removal condition and/or trigger, such as a virtual machine reboot. The I/O manager may manage transfers of ephemeral virtual machine data in response to virtual machines migrating between host computing devices. The I/O manager may be further configured to cache virtual machine data, and/or manage shared file data that is common to two or more virtual machines operating on a host computing device.

21 Claims, 9 Drawing Sheets

Related U.S. Application Data continuation-in-part of application No. 13/829,835, filed on Mar. 14, 2013.

(60) Provisional application No. 61/946,708, filed on Feb. 28, 2014, provisional application No. 61/591,822, filed on Jan. 27, 2012, provisional application No. 61/696,126, filed on Aug. 31, 2012.

(56) References Cited

U.S. PATENT DOCUMENTS

| | | | |
|---|---|---|---|
| 7,415,591 B1* | 8/2008 | Todd | G06F 3/0614 711/165 |
| 7,694,065 B2 | 4/2010 | Petev et al. | |
| 7,752,173 B1 | 7/2010 | Gole | |
| 7,793,061 B1 | 9/2010 | Gupta et al. | |
| 7,975,169 B2* | 7/2011 | Ash | G06F 11/1441 714/6.2 |
| 8,244,935 B2 | 8/2012 | Leventhal et al. | |
| 8,479,294 B1 | 7/2013 | Li et al. | |
| 8,539,124 B1 | 9/2013 | Burke | |
| 8,549,222 B1 | 10/2013 | Kleiman et al. | |
| 8,806,115 B1 | 8/2014 | Patel et al. | |
| 9,058,123 B2 | 6/2015 | Joshi et al. | |
| 9,311,250 B2 | 4/2016 | Van De Ven et al. | |
| 2003/0236945 A1* | 12/2003 | Nahum | G06F 3/0607 711/114 |
| 2004/0059869 A1 | 3/2004 | Orsley | |
| 2004/0169885 A1* | 9/2004 | Mellor | G06F 12/023 358/1.16 |
| 2007/0073971 A1* | 3/2007 | Ezra | G06F 9/3802 711/123 |
| 2007/0294676 A1* | 12/2007 | Mellor | G06F 8/65 717/139 |
| 2008/0155375 A1 | 6/2008 | Vera et al. | |
| 2008/0271039 A1 | 10/2008 | Rolia et al. | |
| 2009/0094391 A1 | 4/2009 | Yim | |
| 2009/0132621 A1 | 5/2009 | Jensen et al. | |
| 2010/0125695 A1 | 5/2010 | Wu et al. | |
| 2010/0211731 A1 | 8/2010 | Mittendorff et al. | |
| 2010/0274962 A1 | 10/2010 | Mosek et al. | |
| 2011/0119228 A1 | 5/2011 | Menze | |
| 2011/0179162 A1 | 7/2011 | Mayo et al. | |
| 2011/0225342 A1 | 9/2011 | Sharma et al. | |
| 2011/0238546 A1 | 9/2011 | Certain et al. | |
| 2011/0238737 A1 | 9/2011 | Agrawal et al. | |
| 2011/0265083 A1 | 10/2011 | Davis | |
| 2011/0320733 A1 | 12/2011 | Sanford et al. | |
| 2012/0017209 A1 | 1/2012 | Ben-Yehuda et al. | |
| 2012/0059994 A1 | 3/2012 | Montgomery et al. | |
| 2012/0131278 A1 | 5/2012 | Chang et al. | |
| 2012/0144110 A1* | 6/2012 | Smith | G06F 3/0607 711/114 |
| 2012/0191928 A1* | 7/2012 | Nakamura | G06F 17/30156 711/156 |
| 2012/0210066 A1 | 8/2012 | Joshi et al. | |
| 2012/0221765 A1 | 8/2012 | Yoo et al. | |
| 2012/0254824 A1 | 10/2012 | Bansod | |
| 2012/0278588 A1 | 11/2012 | Adams et al. | |
| 2012/0311263 A1 | 12/2012 | Kamath | |
| 2013/0036093 A1* | 2/2013 | Heiser | G06F 17/30368 707/634 |
| 2013/0073821 A1 | 3/2013 | Flynn | |
| 2013/0111474 A1 | 5/2013 | Agarwal et al. | |
| 2013/0117744 A1* | 5/2013 | Klein | G06F 9/45533 718/1 |
| 2013/0198748 A1* | 8/2013 | Sharp | G06F 3/0605 718/1 |
| 2013/0227236 A1 | 8/2013 | Flynn et al. | |
| 2013/0232303 A1 | 9/2013 | Quan | |
| 2013/0339958 A1 | 12/2013 | Droste et al. | |
| 2014/0052892 A1 | 2/2014 | Klein | |
| 2014/0068183 A1 | 3/2014 | Joshi et al. | |
| 2014/0115228 A1 | 4/2014 | Zhou et al. | |
| 2014/0136872 A1 | 5/2014 | Cooper et al. | |
| 2014/0156938 A1 | 6/2014 | Galchev et al. | |
| 2014/0297780 A1 | 10/2014 | Zhou et al. | |

FOREIGN PATENT DOCUMENTS

| | | |
|---|---|---|
| WO | 2002001365 A2 | 1/2002 |
| WO | 2014036307 A1 | 3/2014 |

OTHER PUBLICATIONS

USPTO, Office Action Interview Summary for U.S. Appl. No. 13/541,659 dated Aug. 26, 2014.

USPTO, Office Action for U.S. Appl. No. 13/687,979 dated Sep. 9, 2014.

USPTO, Office Action for U.S. Appl. No. 13/192,365 dated Jul. 17, 2014.

USPTO, Office Action for U.S. Appl. No. 13/287,998 dated Jun. 10, 2014.

USPTO, Office Action for U.S. Appl. No. 13/288,005 dated Jul. 8, 2014.

International Preliminary Report on Patentability dated Mar. 3, 2015 for international application PCT/US2013/057366.

Evans, Chris et al., Write-Through, Write-Around, Write-Back; Cache Explained, ComputerWeekly.com http://www.computerweekly.com/feature/Write-through-write-around-write-back-Cache-explained, Nov. 21, 2016.

Joshi, et al., Non-Final Office Action dated Nov. 28, 2016 for U.S. Appl. No. 14/834,157.

Joshi, et al., Final Office Action dated Dec. 5, 2016 for U.S. Appl. No. 13/829,835.

Joshi, et al., Final Office Action dated Nov. 30, 2016 for U.S. Appl. No. 13/829,358.

Joshi, et al., Final Office Action dated Nov. 7, 2014 for U.S. Appl. No. 14/262,581.

Joshi, et al., Final Office Action dated Sep. 25, 2015 for U.S. Appl. No. 13/829,358.

Joshi, et al., Final Office Action dated Sep. 28, 2015 for U.S. Appl. No. 13/829,835.

Joshi, et al., Non-Final Office Action dated Feb. 12, 2015 for U.S. Appl. No. 13/829,835.

Joshi, et al., Non-Final Office Action dated Feb. 6, 2015 for U.S. Appl. No. 13/829,358.

Joshi, et al., Non-Final Office Action dated Jun. 14, 2016 for U.S. Appl. No. 13/829,358.

Joshi, et al., Non-Final Office Action dated Jun. 17, 2016 for U.S. Appl. No. 13/829,835.

Joshi, et al., Notice of Allowance dated Feb. 17, 2015 for U.S. Appl. No. 14/262,581.

Luo, et al., S-CAVE: Effective SSD Caching to Improve Virtual Machine Storage Performance, Proceedings of the 22nd International Conference on Parallel Architectures and Compilation Techniques. IEEE 2013. pp. 103-112.

KR Patent Application No. 10-2015-7007756 (2380.2.355KR) Notice of Allowance mailed Non-Final Office Action dated Dec. 19, 2017.

Notice of Allowance dated Jul. 7, 2017 for U.S. Appl. No. 14/834,157.

Joshi, et al., Office Action dated Nov. 2, 2017 for U.S. Appl. No. 13/829,835.

Joshi, et al., Office Action dated Oct. 5, 2017 for U.S. Appl. No. 13/829,358.

Mellor, et al., Is EMC Developing Storage Super-Stack?, 2011, http://www.theregister.co.uk/2011/01/20/emc_vnx_abstraction_musinhs/.

* cited by examiner

| 565 | |
|---|---|
| *.sys | Admittable |
| *.dat | Exclude |
| *\windows\system32\* | Admittable |
| *\windows\system\* | Admittable |
| *\documents\corporate_template.doc | Admittable |
| *\applications\word_processing\* | Admittable |
| *\working_files\* | Exclude |
| Application_X | Admittable |
| Attrib X | Admittable |
| ... | ... |

FIG. 6

| UFID 555 / 564 | DID 556 |
|---|---|
| \\VID\windows\system32\xpssvcs.dll | F30FA423 |
| \\VID\windows\system32\xpsshhdr.dll | DE451BE4 |
| \\VID\windows\system32\xmlprov.dll | 45AD342E |
| \\VID\windows\system32\ansi.sys | 12EF33A3 |
| \\VID\windows\system32\svchost.exe | 20AE45EA |
| \\VID\windows\system32\kernel32.dll | EA733BA0 |
| ... | ... |

FIG. 7

| DID 556 | 512 | 857 | 859 |
|---|---|---|---|
| F30FA423 | Physical Address: 12 | | 114A, 114B |
| DE451BE4 | Physical Address: 89 | | 114N |
| 45AD342E | Physical Address: 23 | | 114B |
| 12EF33A3 | Physical Address: 42 | | 114A, 114B |
| 20AE45EA | Physical Address: 54 | | * |
| EA733BA0 | Physical Address: 33 | | 114N |
| ... | ... | | ... |

FIG. 8

SYSTEMS AND METHODS FOR STORAGE VIRTUALIZATION

TECHNICAL FIELD

This disclosure pertains to virtual computing systems, including virtual desktop infrastructure (VDI) environments, and, in particular, to systems and methods for improving the performance of input/output (I/O) operations in virtual environments and/or increasing the density of deployed virtual machines.

BRIEF DESCRIPTION OF THE DRAWINGS

This disclosure includes and references the accompanying drawings, which provide a more particular description of the embodiments disclosed herein. The disclosure, however, is not limited to the particular embodiments depicted in the figures. The teachings of the disclosure may be utilized and/or adapted to other embodiments, and/or changes may be made to the disclosed embodiments, without departing from the scope of the disclosure.

FIG. 6 depicts embodiments of file selection criteria;

FIG. 7 depicts embodiments of a file share dictionary;

FIG. 8 depicts further embodiments of a file share dictionary;

DETAILED DESCRIPTION

Figure 1A:
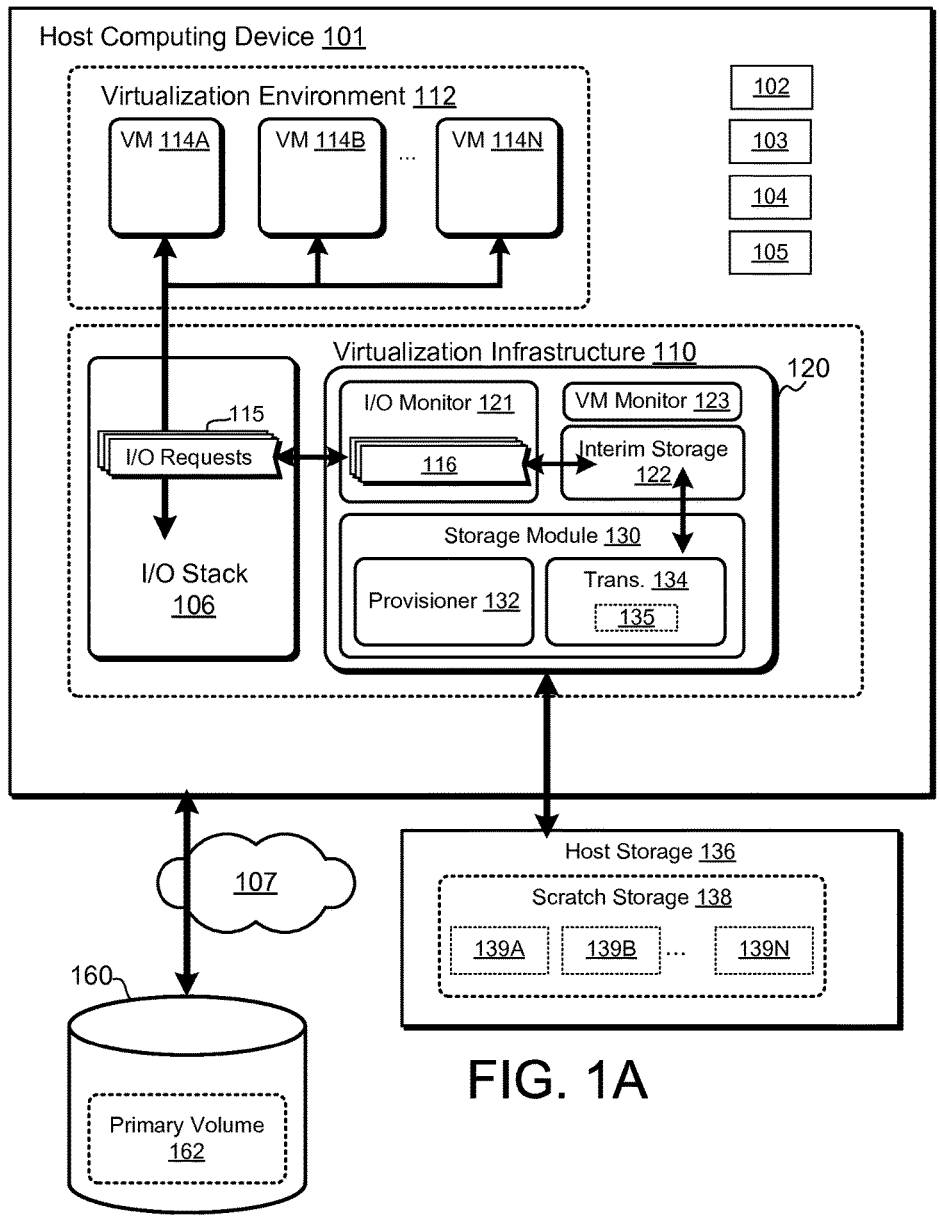
FIG. 1A is a block diagram of one embodiment of a system comprising an I/O manager configured to service I/O requests pertaining to ephemeral data.

A host computing device may be configured to provide a virtualization infrastructure 110 configured to host a plurality of virtual machines. The virtual machines (VMs) may be deployed in a virtual desktop infrastructure (VDI) environment. The number of VMs that the computing system is capable of hosting may be limited by, inter alia, the I/O requirements of the VMs. In some embodiments, the host computing device comprises an I/O manager configured to improve VM I/O performance by, inter alia, reducing the write load overhead of the VMs and/or implementing data sharing between the VMs (e.g., managing a single copy of data shared by and/or common to two or more of the virtual machines).

As used herein, the write load of a VM refers to the overhead involved in servicing write requests of the VM which may include, but is not limited to bandwidth to/from a shared, primary storage resource. The I/O manager may be configured to reduce the write load imposed by VMs operating on a host computing system and/or device by, inter alia, servicing selected write requests of the VMs using a designated storage resource (e.g., a local, high-performance storage device). In some embodiments, the I/O manager implements write vectoring. As used herein, "write vectoring" refers to adapting I/O resources used to service I/O requests based on characteristics of the I/O requests (e.g., persistence requirements of the I/O requests). Data that is suitable for write vectoring includes data that is to be retained while the corresponding storage client (e.g., VM) is running, but can be discarded after a particular time and/or in response to a particular condition and/or trigger (e.g., cycling the VM). Data that can be discarded after a particular time, in response to a particular condition or trigger is referred to herein as "ephemeral data," "temporary data," "transient data," "interim data," "write-vectored data," "disposable data," and/or the like. Ephemeral data may include, but is not limited to: swap files (e.g., virtual memory files, such as pagefile.sys and/or the like); temporary files, such as the contents temporary directories (e.g., "Amp" and/or the like); temporary application files (e.g., local cache of Microsoft Word® or the like); virtual memory management files; database cache files; I/O buffer files, and/or the like. By contrast, non-ephemeral, persistent, or long-term data refers to data that should be retained indefinitely and/or until the data is explicitly erased, deleted, deallocated, and/or the like. Accordingly, non-ephemeral data may be retained across VM cycles. As used herein, a "cycle" of a storage client (e.g., VM) refers to one or more of a reboot operation, restart, reset, power cycle, shutdown, crash, invalid shutdown, power loss, and/or the like.

As used herein, write vectoring may comprise: a) identifying I/O requests pertaining to transient data, and b) servicing the identified I/O requests using designated storage resources that are separate from the primary storage resources to which the write requests are directed.

As used herein, separate storage resources refer to storage resources, volumes, and/or devices that are capable of and/or configured for independent operation. Separate storage resources may refer to storage resources that are physically distinct (e.g., resources that comprise and/or correspond to different storage devices, storage media, and/or the like). A storage resource that is separate from a primary storage volume may, therefore, refer to a storage resource that is separate and/or distinct from the storage resources and/or devices comprising the primary storage volume. Alternatively, storage resources may be separated logically. In one embodiment, for example, storage resources may be separated by logically partitioning a storage medium (e.g., a disk), reserving storage resources for particular clients, and/or the like.

Storage resources designated to store write-vectored data may be referred to herein as ephemeral storage, transient storage, interim storage, scratch storage, and/or the like. Ephemeral storage resources may include, but are not limited to: persistent storage resources (e.g., a solid-state storage device), volatile storage resources (e.g., volatile memory), a combination of persistent and volatile storage resources, and/or the like.

In some embodiments, ephemeral data may be removed from the interim storage resource in response to a removal condition and/or trigger. As used herein, a removal condition of ephemeral data refers to a condition that indicates that the corresponding ephemeral data no longer needs to be retained on the storage resource, such as a VM reboot. Removal conditions may include, but are not limited to: cycling the VM (e.g., restarting and/or rebooting VM), VM shutdown, VM invalidation (e.g., removal and/or destruction of a VM), VM data transfer (e.g., moving ephemeral data of the VM to another storage location), and/or the like. As used herein, removing ephemeral data may include, but is not limited to: erasing the ephemeral data from a storage resource, recording that storage capacity in use by the data is recoverable, deallocating storage resource(s) used to store the data, unmapping storage resource(s) used to store the data (e.g., by use of a TRIM message), invalidating the ephemeral data, and/or the like.

In some embodiments, write requests pertaining to ephemeral data are serviced using a solid-state storage medium that is local to the host computing system (e.g., coupled to a local bus of the host computing system). Accordingly, write-vectored storage operations may be completed without accessing the corresponding primary storage resource(s). Therefore, in some embodiments, write vectoring may be referred to as a write-never cache mode. As used herein, a write-never cache mode refers to a cache mode in which data of a primary storage resource is cached in persistent cache storage, but is not destaged to the backing store (e.g., not written through and/or written back to the backing store). Alternatively, write-vectored storage operations may be referred to as an ephemeral storage mode, in which I/O operations are serviced by use of a designated storage resource configured to retain data of the I/O operations for a limited period of time (e.g., until the corresponding VM reboots, or other trigger condition).

In some embodiments, an integration module presents a virtual storage resource (e.g., a virtual disk and/or volume) within a VM. The virtual storage resource may be designated for storage of ephemeral data. In some embodiments, the VM is configured to associate ephemeral files with the designated virtual storage resource. As used herein, an ephemeral file refers to a file (and/or other storage object or entity) that comprises ephemeral data, as disclosed herein. Accordingly, an ephemeral file refers to a file comprising data that need not be retained between VM cycles (e.g., a file comprising virtual memory swap data, temporary data, buffer data, and/or the like). An ephemeral file may also be referred to as a temporary file, a transient file, an interim file, a write-vectored file, and/or the like. The virtual storage resource designated for the ephemeral file data may be associated with a storage device and/or volume managed by the virtualization host (e.g., virtualization kernel, virtualization infrastructure, hypervisor, or the like). In some embodiments, the storage device and/or volume comprises a disposable disk managed by the virtualization host.

The VM may be configurable to associate ephemeral files with the virtual storage resource. In some embodiments, a redirection module may be configured to associate particular files, particular file paths, particular file volumes, and/or the like with the virtual storage resource (e.g., associate c:\pagefile.sys with x:\pagefile.sys, where x corresponds to the virtual storage resource). The redirection module may comprise, for example, a script that is executable by the VM to modify original volume associations of a set of files such that the files are associated with the designated virtual storage resource, as opposed to the original volume.

The interim storage module may manage write-vector operations by: a) identifying I/O requests pertaining to ephemeral data (e.g., I/O requests directed to the designated virtual storage resource and/or associated storage device), and b) servicing the I/O requests using an interim storage. The interim storage may be separate from and/or independent of the storage device and/or resource associated with the virtual storage resource by the virtual machine host, as disclosed above. The interim storage module may identify I/O requests issued through the designated virtual storage volume as ephemeral I/O requests (e.g., I/O requests that pertain to ephemeral data), and may service the identified ephemeral I/O requests using the interim storage.

The interim storage module may manage VM data stored in the interim storage, which may comprise marking and/or recording that the VM data may be removed from interim storage in response to a removal condition and/or trigger, as disclosed above (e.g., in response determining that the VM is being rebooted). In some embodiments, the interim storage module comprises a provisioner that allocates storage capacity of the interim storage to the VM. Marking the data for removal may comprise marking storage resources allocated to the VM for deallocation (and/or reallocation to other VMs on the virtualization host). Alternatively, or in addition, the VM data may be removed by, inter alia, unmapping logical identifiers (e.g., logical block addresses) used to reference ephemeral data of the VM in the interim storage.

In some embodiments, a VM manager detects VM operating conditions, which may include, but are not limited to: whether a particular VM is currently running, whether a particular VM has rebooted and/or is to be rebooted, whether a particular VM has shut down and/or is to be shut down, whether a particular VM has been hibernated and/or is to be hibernated, whether a particular VM is being moved to another host, and/or the like. The interim storage module may be configured to remove, invalidate, and/or deallocate VM data in the interim storage in response to the determined VM operating conditions, as disclosed above. In one example, the interim storage module may retain VM data in the interim storage in response to determining that the VM is running and/or has been hibernated. The interim storage module may remove, invalidate, and/or deallocate VM data in response to determining that the VM is shutdown, rebooting, and/or the like.

The interim storage module may be further configured to transfer and/or write VM data stored in the interim storage in response to, inter alia, determining that the VM is migrating from the host computing device. In some embodiments, the interim storage module comprises a data transfer module that, in response to determining that a VM is being transferred to another host, either a) provides ephemeral data of the VM to the destination host computing device of the VM and/or b) transfers ephemeral data of the VM to other storage location(s), such as, for example, the storage resource(s) associated with the designated virtual storage resource presented within the VM.

Disclosed herein are embodiments of a method for managing I/O operations in a VDI environment, comprising receiving input/output (I/O) requests pertaining to transient data of a virtual machine directed to a particular storage volume, and servicing the received I/O requests by use of a storage resource of a host computing device that is separate from the particular storage volume. The method may further include recording that storage capacity in use by data associated with the received I/O requests stored on the storage resource is recoverable in response to detecting a reboot operation associated with the virtual machine. The method may further comprise determining that the virtual machine is shut down, and deallocating data of the virtual machine stored in the storage resource.

In some embodiments, the particular storage volume represents a storage capacity that exceeds a storage capacity provisioned to the virtual machine in the storage resource of the host computing device. In such embodiments, the method may further include servicing an I/O request of the virtual machine using a disk corresponding to the particular storage volume in response to filling the storage capacity provisioned to the virtual machine in the storage resource and/or configuring the particular storage volume, such that the particular storage volume corresponds to an empty storage volume in response to a virtual machine reboot.

The method may further include deallocating storage capacity provisioned to the virtual machine in the storage resource in response to determining that the virtual machine is not running on the host computing device. The particular storage volume may correspond to a disposable virtual disk managed by the host computing device. The method may further include transferring data of the virtual machine stored in the storage resource to another host computing device in response to determining that the virtual machine is migrating from the host computing device. In some embodiments, the method further comprises writing data of the virtual machine stored in the storage resource to the particular storage volume in response to determining that the virtual machine is migrating from the host computing device.

Disclosed herein are embodiments of an apparatus, comprising a virtual machine that is configurable to associate an ephemeral file with a designated storage volume, wherein the virtual machine is further configurable to issue write requests pertaining to the ephemeral file to the designated storage volume, wherein the designated storage volume is configured for association with a storage device managed by a host of the virtual machine, and wherein a storage stack of the virtual machine is configurable to receive a completion acknowledgement to a request to write data to the ephemeral file in response to the data being written to an ephemeral storage of the host that is separate from the storage device. The apparatus may further include a redirection module configurable to redirect the ephemeral file from an original storage volume to the designated storage volume.

Disclosed herein are further embodiments of an apparatus, comprising an integration module that presents a virtual disk within a virtual machine configured for operation on a host computing system, wherein the virtual machine is configured to issue write requests pertaining to ephemeral data of the virtual machine to the virtual disk, and an interim storage module that stores data of write requests directed to the virtual disk, wherein the virtual disk is associated with a primary storage volume, and wherein the interim storage module stores the data of the write requests in scratch storage of the host computing system that is separate from the primary storage volume. The interim storage module may be configured to mark data of the virtual machine to be removed from the scratch storage in response to determining that the virtual machine has rebooted. In some embodiments, the apparatus comprises a driver that identifies write requests directed to the virtual disk in a storage stack of the host computing system and/or a redirection script configured to redirect an ephemeral file of the virtual machine from an original storage volume to a storage volume associated with the virtual disk, wherein the ephemeral data of the virtual machine comprises data of the ephemeral file. The apparatus may further include a virtual machine transfer module that preserves data of the virtual machine stored in the scratch storage by one or more of: a) providing the data of the virtual machine stored in the scratch storage to another host computing system and b) moving the data of the virtual machine stored in the scratch storage to the primary storage volume. The host computing system may be configurable to host a plurality of virtual machines, and the apparatus may further include a data sharing module that provides access to two or more of the virtual machines to duplicate data that is common to the two or more of the virtual machines. In such embodiments, the data sharing module may be configured to index the duplicate data to a signature of the duplicate data, and the data sharing module may provide access to the duplicate data in response to a request comprising the signature. The two or more virtual machines may be configured to maintain respective persistent dictionaries that associate a file name pertaining to the duplicate data to the signature of the duplicate data.

Disclosed herein are embodiments of a system, comprising a share module that provides access to file data stored in a storage resource of a virtual machine host to two or more virtual machines operating on the virtual machine host, and an ephemeral storage module that services input/output (I/O) requests pertaining to ephemeral data of the virtual machines directed to respective primary storage volumes, using a separate storage resource of the virtual machine host. The system may further include an I/O filter that identifies I/O requests pertaining to a) file data common to two or more of the virtual machines stored in the storage resource and b) ephemeral data of the virtual machines in a storage stack.

FIG. 1A is a block diagram depicting one embodiment of a system 100A comprising a host computing device 101 configured to host a plurality of virtual machines 114A-N. The host computing device 101 may comprise processing resources 102, volatile memory resources 103, a communication interface 104, and so on. The processing resources 102 may include, but are not limited to, general purpose central processing units (CPUs), application-specific integrated circuits (ASICs), and programmable logic elements, such as field programmable gate arrays (FPGAs), programmable logic arrays (PLAs), and the like. The memory resources 103 may include volatile random-access memory (RAM), such as dynamic RAM (DRAM), cache memory (e.g., processor cache), and/or the like. The communication interface 104 may be configured to communicatively couple the host computing device 101 to a network 107. The network 107 may comprise any suitable communication network, including, but not limited to, a Transmission Control Protocol/Internet Protocol (TCP/IP) network, a Local Area Network (LAN), a Wide Area Network (WAN), a Virtual Private Network (VPN), or a Storage Area Network (SAN). The host computing device 101 may further comprise a base operating environment 105, which may comprise a base operating system, bare-metal operating system, and/or the like.

The host computing device 101 may comprise a virtualization infrastructure 110 configured to implement a virtualization environment 112 for the VMs 114A-N. The virtualization infrastructure 110 may include, but is not limited to, a kernel-based virtualization infrastructure, such as a virtualization kernel or the like, a hypervisor, a virtual machine monitor, a virtual operating platform, and/or the like. The virtualization environment 112 may comprise a guest operating environment, a kernel-based VM environment (KVM), and/or the like.

I/O requests 115 of the virtual machines 114A-N may be serviced by use of an I/O stack 106. The I/O stack 106 may comprise an I/O and/or storage architecture of one or more of the host computing device 101, base operating environment 105, and/or virtualization infrastructure 110. The I/O stack 106 may comprise a framework in which storage services such as file system drivers, volume drivers, disk drivers, Small Computer System Interface (SCSI) drivers, and/or the like are deployed.

I/O requests 115 of the VMs 114A-N may be directed to a primary storage volume 162 and/or a primary storage resource 160 through, inter alia, the I/O stack 106. The primary storage resource 160 may include, but not limited to: one or more storage devices, disks, hard drives, a storage system, a Redundant Array of Inexpensive Disks (RAID), Just a Bunch of Disks (JBOD), network-attached storage (NAS), a SAN, a logical storage unit (LUN), a virtual LUN (vLUN), memory, battery-backed RAM, and/or the like. The primary storage resource 160 may be shared by the plurality of VMs 114A-N and/or VMs deployed on other host computing devices (not shown).

The host computing device 101 may include a VM I/O manager 120 that includes an interim storage module 122 that services I/O requests pertaining to ephemeral data of the VMs 114A-N. The interim storage module 122 may identify I/O requests pertaining to ephemeral data by use of, inter alia, an I/O monitor module 121. The I/O monitor module 121 may comprise a driver configured for operation within the I/O stack 106. The I/O monitor module 121 may be configured to monitor I/O requests by use of I/O Application Programming Interfaces (APIs) and/or libraries published by the base operating environment 105 and/or virtualization infrastructure 110. Accordingly, the I/O monitor module 121 may be implemented in the I/O "path" between the VMs 114A-N and the primary storage resource 160 (and/or other storage resources of the VMs 114A-N). In one embodiment, the I/O monitor module 121 comprises a filter driver configured to monitor I/O request packets (IRP) within the I/O stack 106 of a Microsoft Windows® operating system. The disclosure is not limited in this regard, however, and may be used with any suitable I/O framework and/or I/O stack of any operating system (e.g., Unix®, LINUX, OSX®, Solaris®, or the like) and/or virtualization infrastructure 110.

The interim storage module 122 may identify I/O requests 115 that pertain to ephemeral data of the VMs 114A-N (ephemeral I/O requests 116), and may service the ephemeral I/O requests 116 using scratch store 138. The scratch store 138 may comprise and/or correspond to a host storage resource 136 that is separate from and/or independent of the primary storage volume 162 and/or primary storage resource 160 to which the I/O requests 115 are directed. In some embodiments, the host storage resource 136 comprises a persistent, non-volatile storage medium, which may include, but is not limited to: a solid-state storage medium, NAND flash memory, NOR flash memory, nano RAM (NRAM), magneto-resistive RAM (MRAM), phase change RAM (PRAM), Racetrack memory, Memristor memory, nanocrystal wire-based memory, silicon-oxide-based sub-10 nanometer process memory, graphene memory, Silicon-Oxide-Nitride-Oxide-Silicon (SONOS) memory, resistive RAM (RRAM), programmable metallization cell (PMC) memory, conductive-bridging RAM (CBRAM), and/or the like. Alternatively, or in addition, the host storage resource 136 may comprise volatile memory resources, cache storage resources, and/or the like. Although particular embodiments of storage devices and/or storage media are disclosed herein, the teachings of this disclosure could be applied to any suitable storage medium, including both non-volatile and volatile forms. In some embodiments, the host storage resource 136 may comprise a storage resource that is local to the host computing device 101 (e.g., is coupled to the host computing device 101 by use of a bus, such as a PCI bus, storage bus, and/or the like). Alternatively, the host storage resource 136 may be communicatively coupled to the host computing device 101 by the network 107 and/or another communication infrastructure.

The storage module 130 may comprise a provisioner 132 that manages resource allocation to the VMs 114A-N. In some embodiments, the provisioner 132 allocates storage capacity of the host storage resource 136 for use in storing ephemeral data of the respective VMs 114A-N. The provisioner 132 may adapt resource allocations in accordance with I/O requirements of the VMs 114A-N (e.g., the write load on the VMs 114A-N). The provisioner 132 may be further configured to manage I/O bandwidth and/or I/O operations (IOPs) allocated to the VMs 114A-N in accordance with an allocation policy. The allocation policy may comprise quality of service (QoS) requirements of one or more of the VMs 114A-N, and the provisioner 132 may be configured to allocate cache storage and/or IOPs resources to the VMs 114A-N, in a manner that satisfies the QoS requirements. The provisioner 132 may be further configured to secure data stored in the host storage resource 136 by, inter alia, preventing read-before-write security hazards, as disclosed in further detail herein.

As disclosed above, the VMs 114A-N may be configured to access storage resources of a primary storage volume 162. The virtualization infrastructure 110 may service I/O requests 115 of the VMs 114A-N by accessing the primary storage resource 160 corresponding to the primary storage volume 162, which may comprise issuing the I/O requests 115 to the primary storage resource 160 through the I/O stack 106 of the virtualization infrastructure 110 (and/or host computing device 101). Accordingly, the I/O requests 115 of the plurality of VMs 114A-N operating on the host computing device 101 may be concentrated at the primary storage resource 160. Moreover, the primary storage resource 160 may be utilized by other VMs operating on other host computing devices (not shown), which may further increase the load on the primary storage resource 160 and/or I/O infrastructure (e.g., network 107, I/O buses, and/or the like).

The interim storage module 122 may be configured to reduce the I/O load on the primary storage resource 160 by, inter alia, servicing certain I/O requests 115 using scratch storage 138. The VMs 114A-N may issue I/O requests 115 pertaining to ephemeral data that does not need to be retained for a long period of time (e.g., does not need to be retained between VM cycles). As disclosed above, ephemeral data may be of critical importance while the corresponding VM 114A-N is running, but may not be needed after a reboot cycle and/or restart. Ephemeral data may include, but are not limited to, swap files, such as virtual memory files (e.g., pagefile.sys or the like); temporary files, such as the contents temporary directories (e.g., /tmp or the like); temporary application files (e.g., local cache of Microsoft Word® or the like); and the like.

In some embodiments, the interim storage module 122 services I/O requests pertaining to ephemeral data (ephemeral I/O requests 116) using scratch storage 138, which may be separate from and/or independent of the primary storage resource 160. The data of the ephemeral I/O requests 116 may be retained while the VMs 114A-N are in operation, but need not be retained between VM cycles (e.g., the ephemeral data of a VM 114A-N does not need to be retained between VM reboot cycles). Therefore, servicing an ephemeral I/O request 116 may comprise accessing the host storage resource 136 without accessing the primary storage resource 160 (e.g., without writing the ephemeral data through and/or back to the primary storage resource 160). The host storage resource 136 may comprise a high-performance storage device that is local and/or closely coupled to the host computing device 101. Servicing ephemeral I/O requests 116 using the interim storage module 122 may provide significant performance benefits: ephemeral I/O requests 116 do not require accesses to primary storage resource 160 and, as such, do not contribute to the I/O load to the primary storage resource 160. Moreover, the latency associated with primary storage resource 160 may be removed from the "critical path" for servicing ephemeral I/O requests 116, such that the requests 116 can be serviced more efficiently. As used herein, the critical path refers to the timing and/or latency path of an I/O operation and/or request. In a write-through cache configuration, for example, I/O requests 115 may not complete until data is written through to the corresponding primary storage resource 160. Therefore, the critical path of the I/O operation includes one or more high-latency primary storage accesses. By contrast, ephemeral I/O requests 116 may be completed exclusively within the host storage resource 136, without accessing the primary storage resource 160. Accordingly, the critical path of an ephemeral I/O request 116 does not include high-latency accesses to primary storage resource 160. Therefore, in addition to reducing the latency for the VMs 114A-N, the interim storage module 122 may provide the additional benefit of reducing the I/O bandwidth and/or load on the primary storage resource 160.

In some embodiments, the interim storage module 122 identifies I/O requests pertaining to ephemeral data (ephemeral I/O requests 116), and services the identified I/O requests 116 using the scratch storage 138. Ephemeral I/O requests 116 may be serviced by: a) writing data of the ephemeral I/O requests 116 to the scratch storage 138, b) reading data from the scratch storage 138, and/or the like. In some embodiments, the provisioner 132 allocates storage capacity within the host storage resource 136 to particular VMs 114A-N. Servicing an ephemeral I/O request 116 may, therefore, comprise mapping and/or translating the ephemeral I/O request 116 to a particular region and/or section of the host storage resource 136 (e.g., a region and/or section that has been allocated to the corresponding VM 114A-N) by use of a translation module 134. The translation module 134 may, for example, map a VM 114A-N to provisioned storage resources by associating an identifier of the VM 114A-N with a set, range, and/or extent of identifiers of the host storage resource 136 (e.g., a set, range, and/or extent of logical identifiers, logical block addresses, virtual addresses, physical storage addresses, and/or the like). The translation module 134 may be further configured to map data identifiers pertaining to the ephemeral I/O requests 116 (primary identifiers) to identifiers of the scratch storage 138 (interim identifiers). As used herein, a primary identifier corresponds to an identifier used by the VM 114A-N, virtualization infrastructure 110, and/or host computing device 101 to reference data stored within a primary storage volume 162 and/or a primary storage resource 160. A primary identifier may, therefore, comprise and/or be derived from an identifier and/or address of the data on the primary storage volume 162 and/or primary storage resource 160 to which an ephemeral I/O request 116 pertains (e.g., a logical block address within the logical address space of the primary storage resource 160, a physical address and/or offset within a physical address space of the primary storage resource 160, and/or the like). As illustrated in FIG. 1A, the interim storage module 122 may be configured to service ephemeral I/O requests 116 of a plurality of VMs 114A-N operating on the host computing device 101. Accordingly, in some embodiments, the primary addresses assigned to ephemeral data stored in the scratch storage 138 may further include and/or incorporate respective VM identifiers (VMIDs) corresponding to the VMs 114A-N. The VMIDs may be used to distinguish data and/or primary identifiers of different VMs 114A-N and/or to prevent unauthorized access to VM data. As used herein, an interim identifier corresponds to an identifier and/or address of ephemeral data stored in the scratch storage 138. Accordingly, an interim identifier may comprise and/or be derived from identifiers and/or addresses of ephemeral data within the scratch storage 138 (e.g., a logical identifier, logical address, virtual address, physical address, and/or the like).

In some embodiments, the translation module 134 maintains metadata 135 comprising associations between the primary identifier(s) of ephemeral data of the VMs 114A-N stored in the scratch storage 138 and the corresponding interim identifier(s) of the data stored within the host storage resource 136 (e.g., using data tags, as disclosed in further detail herein). The metadata 135 may comprise a forward map that assigns interim identifiers allocated to a particular VM 114A-N to the primary identifiers of data of the particular VMs 114A-N stored in the scratch storage 138. The metadata 135 may further comprise and/or identify unassigned interim identifiers allocated to the particular VM 114A-N. As used herein, an unassigned interim identifier refers to an interim identifier that is not currently in use to reference data stored in the host storage resource 136 and/or is not associated with a primary identifier of the particular VM 114A-N. Accordingly, unassigned interim identifiers of a VM 114A-N represent storage capacity that is available to store ephemeral data of the VM 114A-N. Unassigned interim identifiers may also be referred to as unmapped interim identifiers, unbound interim identifiers, available interim identifiers, and/or the like. Interim identifiers that are currently in use to reference ephemeral data stored within the scratch storage 138 may be referred to as assigned, bound, unavailable, occupied, and/or the like. Accordingly, in some embodiments, servicing an ephemeral I/O request 116 of a VM 114A-N may comprise: a) identifying an available interim identifier allocated to the VM 114A-N (using the metadata 135), b) writing data of the ephemeral I/O request 116 to the identified interim identifier within the scratch storage 138, and c) mapping the identified interim identifier to a primary identifier corresponding to the ephemeral I/O request 116. A subsequent request to read the data of the ephemeral I/O request 116 may be serviced by: a) determining whether data corresponding to the ephemeral I/O request 116 is available in the scratch storage 138 by, inter alia, determining whether the primary identifier corresponding to the ephemeral I/O request 116 is mapped to an interim identifier in the metadata 135, and b) accessing data corresponding to the ephemeral I/O request 116 stored within the scratch storage 138 (using the interim identifier assigned to the primary identifier).

As disclosed above, the interim storage module 122 may identify ephemeral I/O requests 116 by, inter alia, monitoring I/O requests 115 within the I/O stack 106 (by use of the I/O monitor module 121). The I/O requests 115 may be filtered using, inter alia, an ephemeral selection criterion, which may include, but is not limited to: a file name, file path, primary storage resource 160, primary storage volume 162, primary identifier (e.g., a particular range of identifiers or physical storage addresses), and/or the like. In some embodiments, the interim storage module 122 is configured to filter all I/O requests 115 directed to a particular primary storage volume 162 and/or primary storage resource 160 (e.g., identify all I/O requests 115 directed to the particular primary storage volume 162 and/or primary storage resource 160 as ephemeral I/O requests 116). Alternatively, or in addition, the interim storage module 122 may be configured to identify all I/O requests 115 received through a particular virtual disk and/or storage volume of the VMs 114A-N as ephemeral I/O requests 116. In some embodiments, the VMs 114A-N are configured to identify I/O requests 115 that pertain to ephemeral data, which may comprise one or more of: including metadata with I/O requests 115 to indicate that the I/O requests 115 pertain to ephemeral data (e.g., tagging the requests 115, using IOCTL parameters, and/or the like); directing I/O requests 115 to a designated virtual storage resource, device, disk, and/or volume; and/or the like. The I/O manager 120 may be configured to: a) monitor I/O requests 115 directed to a primary storage volume 162 and/or primary storage resource 160 (by use of the I/O monitor 121), b) identify I/O requests 115 that pertain to ephemeral data of a VM 114A-N (e.g., filter ephemeral I/O requests 116), and c) redirect the identified, ephemeral I/O requests 116 to the interim storage module 122. The interim storage module 122 may service the ephemeral I/O requests 116 using the scratch storage 138 provisioned to the corresponding VM 114A-N, which may comprise reading and/or writing data of the ephemeral I/O requests 116 to the scratch storage 138 without accessing the primary storage volume 162 and/or primary storage resource 160. The I/O manager 120 and/or interim storage module 122 may acknowledge completion of the identified ephemeral I/O requests 116 in response to servicing the requests 116 using the scratch storage 138 (and without accessing the primary storage volume 162). Ephemeral I/O requests 116 may be acknowledged by use of the I/O stack 106 (e.g., by issuing an acknowledgement message, providing a return value, and/or the like). The I/O manager 120 and/or interim storage module 122 may, therefore, service and acknowledge completion of I/O requests 115 pertaining to ephemeral data of the VMs 114A-N by a) identifying I/O requests 115 directed to a primary storage volume 162 and/or primary storage resource 160 that pertain to ephemeral data, b) redirecting the identified ephemeral I/O requests 116 to the interim storage module 122, c) servicing the identified ephemeral I/O requests 116 using the scratch storage 138, and d) acknowledging completion of the ephemeral I/O requests 116 in response to reading and/or writing ephemeral data in the scratch storage 138 (and without accessing the primary storage volume 162 and/or primary storage resource 160 to which the ephemeral I/O request 116 was originally directed).

The interim storage module 122 may be configured to manage ephemeral data 139A-N of the VMs 114A-N stored on the host storage resource 136 and/or scratch storage 138. As illustrated in FIG. 1A, the scratch storage 138 comprises ephemeral data 139A of VM 114A, ephemeral data 139B of VM 114B, ephemeral data 139N of VM 114N, and so on. The interim storage module 122 may be configured to remove invalidate, and/or recover storage resources used to store the ephemeral data 139A-N of a VM 114A-N in response to a removal condition and/or trigger, such as a VM reboot operation. As disclosed above, the interim storage module 122 may associate ephemeral data 139A-N stored in the scratch storage 138 with respective VMIDs (by use of the metadata 135). The interim storage module 122 may be further configured to mark and/or record that the ephemeral data 139A-N of the particular VMs 114A-N may be removed in response to one or more removal conditions and/or triggers (in the metadata 135). The interim storage module 122 may, for example, record that storage capacity in use by ephemeral data 139A-N of a particular VM 114A-N is recoverable in response to detecting a reboot operation associated with the particular VM 114A-N. Accordingly, the metadata 135 corresponding to the ephemeral data 139A-N stored on the scratch storage 138 may: a) identify the VM 114A-N associated with the ephemeral data 139A-N, b) map the ephemeral data 139A-N to respective primary identifiers (and/or interim identifiers), and/or c) indicate that the ephemeral data 139A-N can be removed in response to a removal condition and/or trigger pertaining to the corresponding VM 114A-N.

The I/O manager 120 may comprise a VM monitor 123 that monitors the operating status of the VMs 114A-N. The VM monitor 123 may monitor VM status by one or more of accessing APIs, modules, and/or libraries of the virtualization infrastructure 110; actively interrogating the VMs 114A-N; and/or the like. The VM monitor 123 may be configured to determine, inter alia, whether a particular VM 114A-N is currently running on the host computing device 101, is rebooting and/or restarting, is being shut down, is being removed (e.g., deleted), is transferring to another host, and/or the like.

In response to determining that a VM 114A-N is rebooting, restarting, being shut down, and/or being removed (e.g., deleted), the interim storage module 122 may remove the ephemeral data 139A-N corresponding to the VM 114A-N. Removing the ephemeral data 139A-N of a VM 114A-N may comprise one or more of: a) deleting the ephemeral data 139A-N from the host storage resource 136, b) deallocating storage resources comprising the ephemeral data 139A-N, c) indicating that the storage resources comprising the ephemeral data 139A-N are recoverable (e.g., unmapping the data and/or invalidating the data), and/or the like. In some embodiments, the interim storage module 122 may issue deallocation hints (e.g., TRIM messages) to the storage module 130 to configure the storage module 130 to remove the ephemeral data 139A-N of a particular VM 114A-N. Deallocating, unmapping, and/or invalidating ephemeral data 139A-N may allow the host storage resource 136 to remove the ephemeral data 139A-N in a garbage collection and/or storage recovery operation. The provisioner 132 may be configured to provision the corresponding storage resources to one or more other VMs 114A-N.

In some embodiments, the VMs 114A-N may be transferred from the host computing device 101 to other host computing systems (not shown). A VM 114A-N that is being transferred may need access to the corresponding ephemeral data 139A-N stored in the scratch storage 138. The VM monitor 123 may determine that a VM 114A-N is being moved from the host computing device 101, and, in response, the interim storage module 122 may: a) provide the ephemeral data 139A-N of the VM 114A-N to the new host computing device, and/or b) transfer the ephemeral data 139A-N of the VM 114A-N to an alternative storage location (e.g., the primary storage volume 162 and/or primary storage resource 160). Further embodiments of systems and methods for transferring data pertaining to a VM are disclosed in U.S. patent application Ser. No. 13/541,659, entitled, "Systems, Methods, and Apparatus for a Virtual Machine Cache," filed for Vikram Joshi et al., Jul. 3, 2012, and U.S. patent application Ser. No. 13/687,979, entitled, "Systems, Methods, and Apparatus for Cache Transfers," filed Nov. 28, 2012, each of which is hereby incorporated by reference in its entirety.

The storage capacity allocated to the VMs 114A-N in the scratch storage 138 may be limited. Ephemeral data of the VMs 114A-N may exceed the storage capacity allocated thereto. In response, the provisioner 132 may adjust storage allocations of the VMs 114A-N in accordance with the ephemeral data requirements of the VMs 114A-N. Since the ephemeral data 139A-N only exists in the scratch storage 138 (the data 139A-N has not been written through and/or written back to a primary storage resource 160), the interim storage module 122 may not remove (evict) existing ephemeral data 139A-N to free additional capacity. In some embodiments, when the storage capacity allocated to a VM 114A-N is exhausted (and additional capacity is not available), the interim storage module 122 may redirect requests to admit additional ephemeral data to the primary storage volume 162 (e.g., the original destination of the I/O requests 116). Accordingly, the additional data may overflow from the scratch storage 138 to the primary storage volume 162.

Figure 1B:
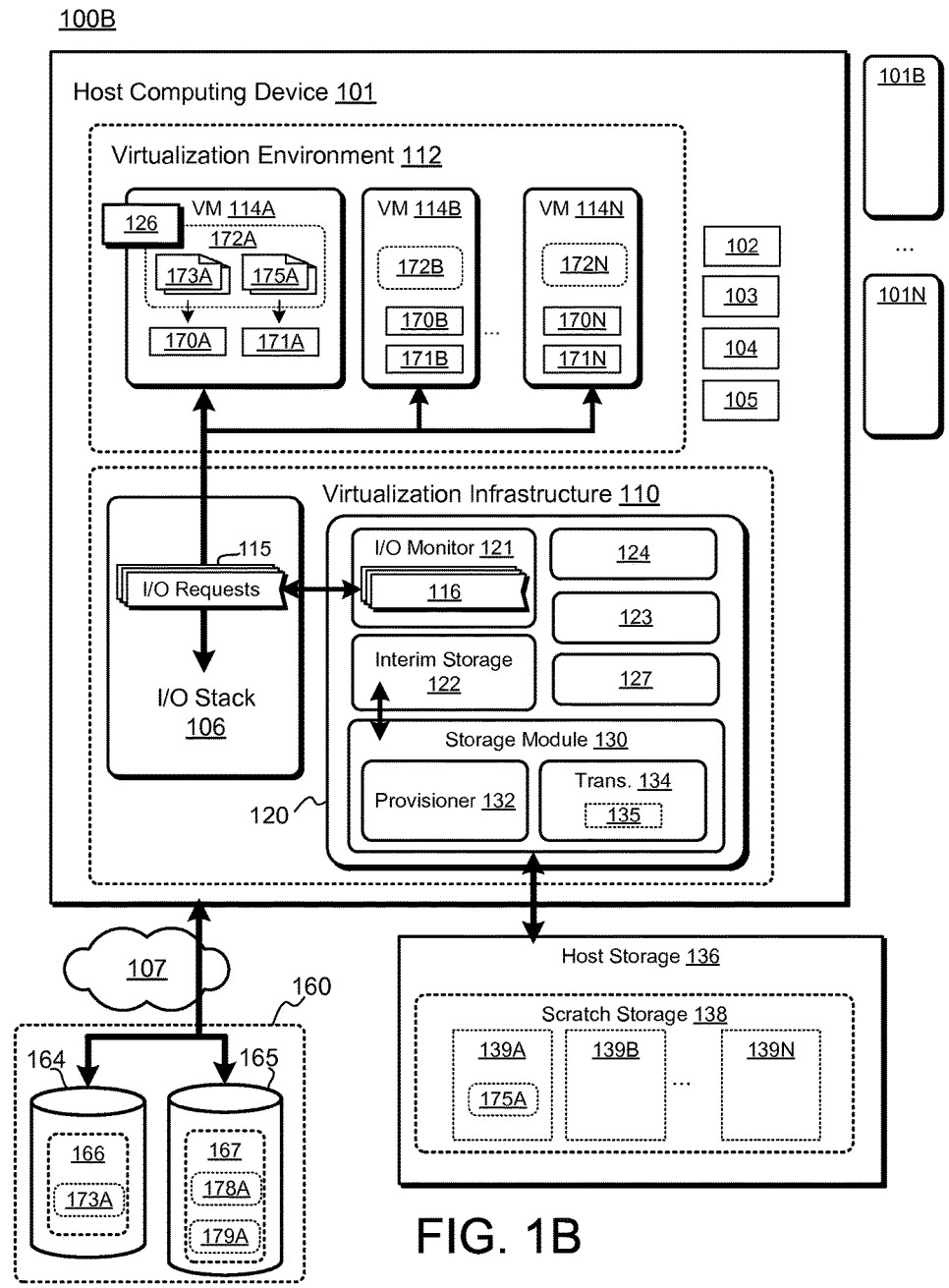
FIG. 1B is a block diagram of another embodiment of a system comprising an I/O manager configured to service I/O requests pertaining to ephemeral data.

FIG. 1B is a block diagram of another embodiment of a system 100B comprising a host computing device 101 that includes an I/O manager 120 configured to manage I/O requests pertaining to ephemeral data. As illustrated in FIG. 1B, the VMs 114A-N may comprise respective virtual disks 170A-N (e.g., respective virtual storage resources, disks, volumes, and/or the like). The VMs 114A-N may use the respective virtual disks 170A-N to perform I/O operations, which may include reading and/or writing files 172A-N. The virtual disks 170A-N may be used to manage storage objects of the VMs 114A-N, such as files and/or the like. In some embodiments, the virtual disks 170A-N may correspond to respective drives and/or volumes of an operating system and/or file system of the VMs 114A-N (e.g., the "c:\" drive of a Windows operating system, the root of a UNIX and/or Linux file system, and/or the like). The virtual disks 170A-N may be associated with respective primary storage resource(s) 160 (e.g., storage resource(s) 164 and/or storage volumes 166). The virtualization infrastructure 110 may service I/O requests directed to the virtual disks 170A-N by use of the I/O stack 106 and/or storage resource(s) 164, as disclosed above. Accordingly, writing data to particular files 172A (e.g., non-ephemeral files 174A) may comprise writing the data to the storage resource 164 and/or storage volume 166. As illustrated in FIG. 1B, data of the non-ephemeral files 174A are stored within the storage volume 166 (and storage resource(s) 164) associated with the virtual disk 170A. The virtual disks 170B-N of the VMs 114B-N may be associated with respective storage volume(s) and/or storage resource(s), but are not shown to avoid obscuring the details of the illustrated embodiments.

In the FIG. 1B embodiment, the I/O manager 120 includes an integration module 124 that is configured to present virtual disks 171A-N within the VMs 114A-N. The virtual disks 171A-N may comprise and/or correspond to a virtual storage resource such as a volume, disk, and/or the like (e.g., a virtual machine disk format (VMDK) disk, a virtual storage volume, and/or the like). The virtual disks 171A-N may be designated for use with ephemeral data and, as such, may be referred to as designated virtual disks and/or designated disks 171A-N. The integration module 124 may present the designated virtual disks 171A-N within the VMs 114A-N by use of APIs, libraries, configuration, and/or settings of the virtualization infrastructure 110. The designated virtual disks 171A-N may be associated with a primary storage resource 160, such as a primary storage volume 167 on storage resource 165. In some embodiments, the primary storage volume 167 associated with the designated virtual disks 171A-N comprises a disposable storage volume 167 (e.g., a disposable disk) managed by the virtualization infrastructure 110. As used herein, a disposable storage volume refers to a storage volume that discards changes made during the runtime of a corresponding VM 114A-N. Although the primary storage volume 167 and/or primary storage resource 165 of the designated virtual disks 171A-N are shown as separate from and/or independent of the other storage volume(s) 166 and/or storage resources 164, the disclosure is not limited in this regard, and could be adapted to implement the primary storage volume 167 on the same set of storage resource(s) as the storage volume 164 of the virtual disks 170A-N.

The VMs 114A-N may comprise respective sets of files 172A-N, which may be managed by, inter alia, a guest operating system and/or file system of the VMs 114A-N. The files 172A may initially be associated with the virtual disk 170A (the "base" virtual disk 170A). As disclosed herein, certain files 172A-N may comprise ephemeral data that does not need to be retained between VM cycles (ephemeral files 175A). The VM 114A may associate ephemeral files 175A with the designated virtual disk 171A. Other, non-ephemeral files 174A may continue to be associated with the base virtual disk 170A. The VM 114A may issue I/O requests 115 pertaining to the non-ephemeral files 174A to the base virtual disk 170A, and may issue I/O requests 115 pertaining to the ephemeral files 175A to the designated virtual disk 171A. The I/O monitor 121 may be configured to identify I/O requests issued to the designated virtual disks 171A-N as ephemeral I/O requests 116, which may be serviced by the interim storage module 122 (and scratch storage 138), as disclosed above. Requests issued to the base virtual disks 170A-N (and/or other virtual storage resources) may be serviced by use of the storage volume(s) 166 and/or resource(s) 164 associated with the virtual disks 170A-N. Servicing an ephemeral I/O request 116 directed to a designated virtual disk 171A-N may comprise reading and/or writing data pertaining to the ephemeral I/O request 116 to the scratch storage 138 on the host storage resource 136 (e.g., according to the storage capacity allocated to the corresponding VM 114A-N) without accessing the primary storage resource(s) 160 associated with the designated virtual disk 171A-N (e.g., storage resource 165 and/or storage volume 167). Accordingly, the I/O manager 120 may be configured to redirect I/O requests 115 associated with the designated virtual disks 171A-N from the corresponding primary storage resource(s) 160 (e.g., storage volume(s) 167 and/or resource(s) 165) to the interim storage module 122. The interim storage module 122 may acknowledge completion of ephemeral I/O requests 116 in response to servicing the ephemeral I/O requests 116 using the host storage resource 136 and without accessing the primary storage resources 160 associated with the designated virtual disk 171A (e.g., storage volume 167 and/or storage resources 165).

Data pertaining to non-ephemeral files 174A of the VM 114A may be stored in the storage volume 166 and, as such, I/O requests 115 pertaining to the files 174A may consume resources of the host computing device 101, bandwidth to/from the primary storage resource(s) 160 (e.g., network bandwidth), consume IOPs of the storage resource(s) 164, and so on. As illustrated in FIG. 1B, the system 100B may comprise a plurality of host computing devices 101B-N, which may host a plurality of VMs. The primary storage resource 160 may be shared by the VMs VMs 114A-N and VMs operating on the other host computing devices 101B-N. The availability of primary storage resource 160 (storage resources 164 and/or 165) may, therefore, limit the number of VMs that can operate in the system 100B (e.g., be a bottleneck and/or limiting factor for the system 100B). However, redirecting I/O requests 115 from the primary storage resource(s) 160 to the host storage resource 136 of the host computing device 101 may reduce the load on the shared, primary storage resource(s) 160 and thereby enable the system 100B to host a larger number of VMs and/or improve the performance of the VMs.

In the FIG. 1B embodiment, data of the ephemeral files 175A of VM 114A is stored in scratch storage 138 as opposed to the primary storage resource(s) 160 associated with the designated virtual disk 171A (e.g., storage volume 167 and/or storage resource(s) 167). Therefore, I/O operations pertaining to the ephemeral files 175A may not contribute to the load on shared, primary storage resources 160.

As disclosed above, the interim storage module 122 may record that the data of the ephemeral files 175A stored within the scratch storage 138 can be removed from the host storage resource 136 in response to a removal trigger and/or condition (e.g., VM reboot). The VM monitor 123 may monitor the operating state of the VM 114A to detect a removal condition and/or trigger (e.g., a VM reboot, shutdown, deletion, or the like). In response, the interim storage module 122 may remove ephemeral data pertaining to the files 175A from the scratch storage 138, which may comprise a) deleting the data of ephemeral files 175A, b) recording that storage resources used to store the data of ephemeral files 175A can be recovered, c) deallocating and/or unmapping the data of ephemeral files 175, and/or the like.

In some embodiments, the system 100B comprises a redirection module 126 that redirects certain files 172A of the VM 114A (and/or other VMs 114B-N) from an original, base virtual disk 170A to the designated virtual disk 171A. The redirection module 126 may, for example, replace a file path of one or more files to associate the one or more files, paths, directories, and/or volumes with the designated virtual disk 171A (e.g., redirect references to "c:\pagefile.sys" to "x:\pagefile.sys," redirect "c:\tmp" to "x:\tmp," and so on). The redirection module 126 may comprise a script configured to associate the ephemeral files 175A with the designated virtual disk 171A as part of a one-time initialization operation. Alternatively, or in addition, the redirection module 126 may modify file associations in real time (and/or on an as-needed basis) as new ephemeral files 175A are identified. In one embodiment, the redirection module 126 may designate new ephemeral files 175A in response to installing a new application and/or service on the VM 114A. For example, the redirection module 126 may associate one or more buffer files of a database application with the designated virtual disk 171A in response to installing and/or activating the database application on the VM 114A.

The respective storage volumes 167 associated with the designated virtual disks 171A-N represent empty storage volume(s) (e.g., an empty, formatted NTFS storage volume). Accordingly, when a VM 114A-N initially boots, the designated virtual disks 171A-N will appear to be empty (e.g., read requests will not return any data, regardless of whether data was written to the designated virtual disk 171A in a previous session). Ephemeral data written to the designated virtual disks 171A-N may be stored within the scratch storage 138, and not written through and/or back to the primary storage volume 167. Ephemeral data written to the scratch storage 138 may be removed when the corresponding VMs 114A-N reboot and, as such, each time the VMs 114A-N cycle, the designated virtual disk 171A-N comprises an empty storage volume.

The integration module 124 may configure the virtual disks 171A-N to represent a fixed-size storage device within the VMs 114A-N (e.g., a 1 TB disk). The fixed size represented by the virtual disks 171A-N may differ from the storage capacity dynamically provisioned to the VMs 114A-N by the provisioner 132. The designated virtual disks 171A-N may be thinly provisioned, such that the designated virtual disks 171A-N represent a larger storage capacity than the storage capacity provisioned to the corresponding VMs 114A-N by the provisioner 132. Accordingly, a particular VM 114A-N may attempt to write more ephemeral data 139A-N than the storage capacity allocated to the particular VM 114A-N. In response, the provisioner 132 may attempt to increase the storage capacity provisioned to the particular VM 114A-N. If sufficient storage capacity is not available, the interim storage module 122 may redirect subsequent ephemeral I/O requests 116 to the primary storage volume 167 (by use of the I/O stack 106). The primary storage volume 167 may, therefore, comprise overflow ephemeral data 178A of the VM 114A. As disclosed above, the primary storage volume 167 may comprise a disposable disk managed by the virtualization infrastructure 110. Accordingly, when the VM 114A cycles, the overflow ephemeral data 178A of the VM 114A may not be retained, and the designated virtual disk 171A may appear as an empty, formatted disk.

As disclosed above, a VM 114A-N may be transferred from the host computing device 101 to another host computing device 101B-N. The VM monitor 123 may determine that a particular VM 114A-N is to be transferred (and/or is in the process of being transferred). In response, a transfer module 127 of the I/O manager 120 may be configured to provide ephemeral data 139A-N of the VM 114A-N to the destination host computing device 101B-N. In some embodiments, the transfer module 127 is configured to retain the ephemeral data 139A-N of the VM 114A-N until the data is requested by the destination host computing device 101B-N. Alternatively, or in addition, the transfer module 127 may transmit the ephemeral data 139A-N (e.g., push the ephemeral data 139A-N) to the destination host computing device 101B-N. Further embodiments of systems and methods for transferring VM data are disclosed in U.S. patent application Ser. No. 13/541,659, entitled, "Systems, Methods, and Apparatus for a Virtual Machine Cache," filed for Vikram Joshi et al., Jul. 3, 2012, and U.S. patent application Ser. No. 13/687,979, entitled, "Systems, Methods, and Apparatus for Cache Transfers," filed Nov. 28, 2012, each of which is hereby incorporated by reference in its entirety. Alternatively, or in addition, the transfer module 127 may be configured to move the ephemeral data 139A-N of a VM 114A-N that is being transferred from the host computing device 101 to the primary storage resource 160 (e.g., storage volume 167 and/or storage resource 165). Moving the ephemeral data 139A of the VM 114A may comprise writing the ephemeral data 139A, including the data of ephemeral files 175A, to the primary storage volume 167 (as transferred ephemeral data 179A). The transferred ephemeral data 179A may comprise an identifier of the VM 114A (e.g., a VMID). The destination host computing device 101B may be configured to access the transferred ephemeral data from the primary storage volume 167 and/or from the primary storage resources 165.

The transfer module 127 may be further configured to access ephemeral data of VMs 114A-N transferred to the host computing device 101 from one or more other host computing devices 101B-N. I/O manager 120 may determine that a VM 114A-N has been transferred to the host computing device 101 in response to receiving an ephemeral I/O request 116 of the VM 114A-N. Alternatively, or in addition, the VM monitor 123 may be configured to detect VM transfer events, including detecting VMs 114A-N that are being transferred to the host computing device 101. In response to detecting a new VM 114A-N, the provisioner 132 may allocate storage resources for the VM 114A-N in the scratch storage 138. The transfer module 127 may be configured to a) access ephemeral data of the VM 114A-N from an original host computing device 101B-N, b) access ephemeral data of the VM 114A-N in a primary storage volume 167 and/or primary storage resource(s) 165, and/or the like. The transfer module 127 may be further configured to populate ephemeral storage 139A-N allocated to the VM 114A-N with the accessed ephemeral data. Alternatively, or in addition, the interim storage module 122 may be configured to redirect ephemeral I/O requests pertaining to the incoming VM 114A-N to the primary storage volume 165 and/or primary storage resource(s) 165 associated with the designated virtual disk 171A-N of the VM 114A-N.

As disclosed above, the primary storage volume 167 associated with the designated virtual disk 171A may comprise a disposable disk managed by the virtualization infrastructure 110 and, as such, overflow ephemeral data 178A and/or transferred ephemeral data 179A may be removed from the primary storage volume 167 in response to a VM reboot (and/or other removal trigger and/or condition).

Figure 1C:
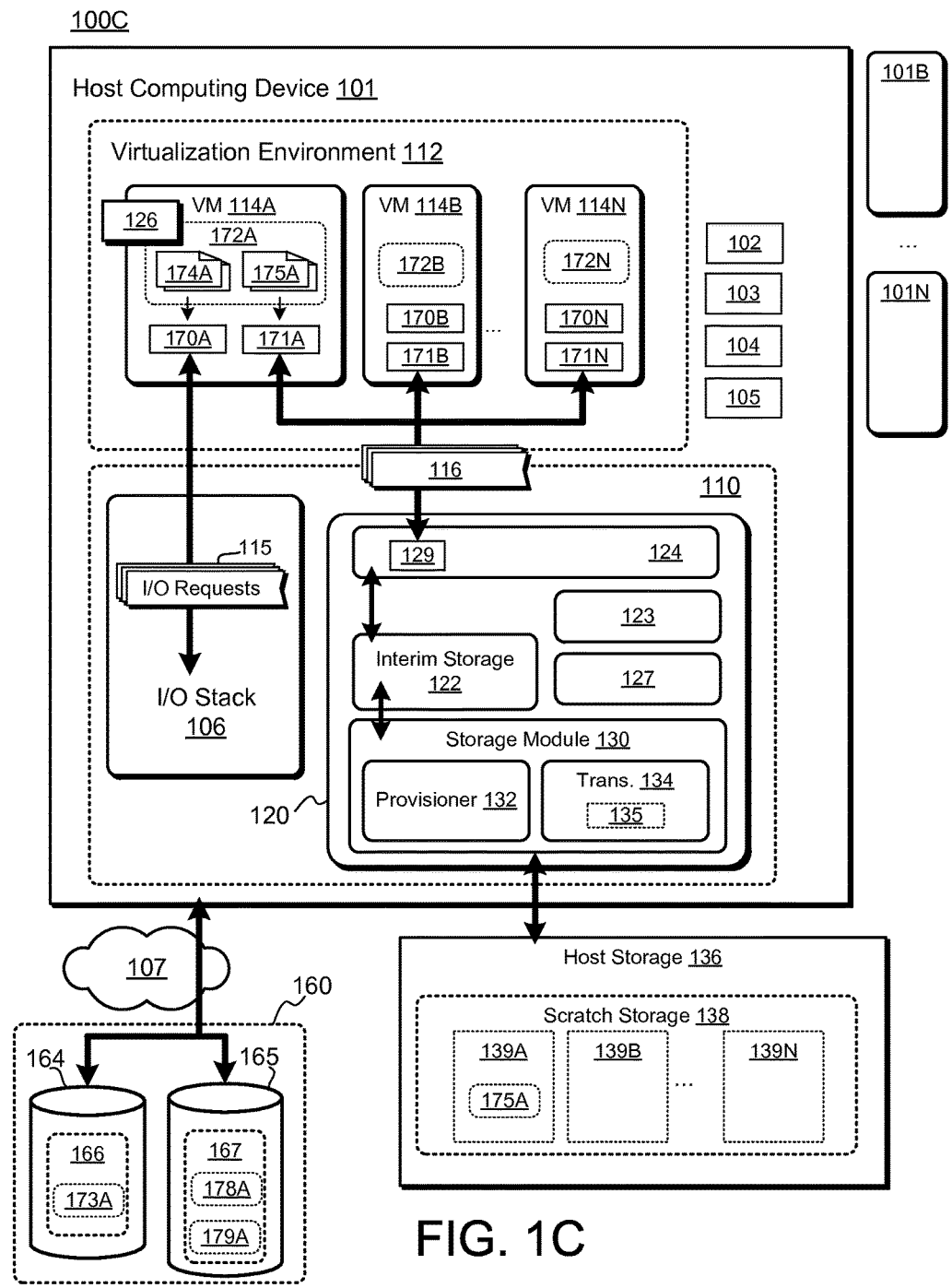
FIG. 1C is a block diagram of another embodiment of a system comprising an I/O manager configured to service I/O requests pertaining to ephemeral data.

FIG. 1C depicts another embodiment of a system 100C comprising an I/O manager 120 configured to manage I/O requests of VMs 114A-N operating on a host computing device 101. In the FIG. 1C embodiment, the integration module 124 comprises a virtual disk driver 129 (e.g., a VLUN driver, and/or the like). The virtual disk driver 129 may be configured to receive I/O requests 116 issued to the designated virtual disks 171A-N. (I/O requests 115 issued to other virtual disks of the VMs 114A-N, such as virtual disks 170A-N, may be serviced by use of the I/O stack 106.) The virtual disk driver 129 may receive the ephemeral I/O requests 116 issued to the designated virtual disks 171A-N, which may be serviced by use of the interim storage module 122 (and scratch storage 138), as disclosed herein. Although the designated virtual disks 171A-N are shown as being associated with a primary storage resource (storage volume 167 and/or storage resource 165), the disclosure is not limited in this regard, and could be adapted to service ephemeral I/O requests 116 directly, without associating the designated virtual disks 171A-N with primary storage volume(s) and/or resources. Further embodiments of systems and methods for write-vectored storage are disclosed in U.S. Provisional Patent Application Ser. No. 61/946,708 entitled "Systems and Methods for Storage Virtualization," filed Feb. 28, 2014 for Jerene Zhe Yang et al., U.S. patent application Ser. No. 13/829,358 entitled "Systems, Methods, and Interfaces for Adaptive Cache Persistence," filed Mar. 14, 2013 for Vikram Joshi et al., U.S. patent application Ser. No. 13/829,835 entitled "Systems, Methods and Interfaces for Adaptive persistence," filed Mar. 14, 2013 for Vikram Joshi et al., and U.S. Provisional Patent Application Ser. No. 61/696,126 entitled "Systems, Methods and Interfaces for Adaptive Persistence," filed Aug. 31, 2012 for Vikram Joshi et al., each of which is incorporated by reference in its entirety.

Figure 1D:
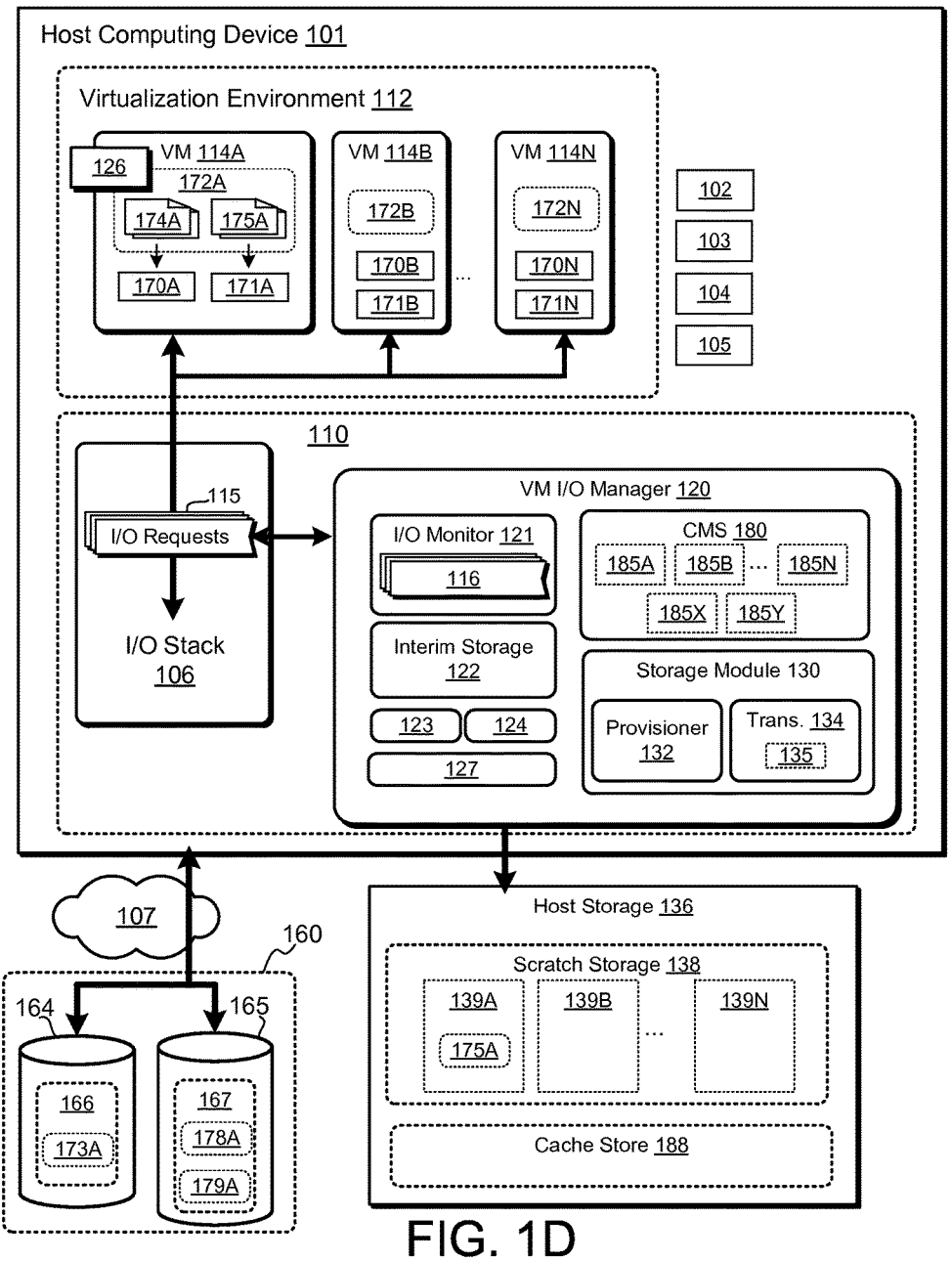
FIG. 1D is a block diagram of another embodiment of a system comprising an I/O manager configured to cache VM data and/or service I/O requests pertaining to ephemeral data.
Figure 2:
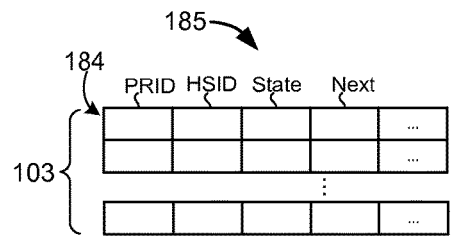
FIG. 2 is a block diagram that illustrates embodiments of I/O metadata.

FIG. 1D depicts another embodiment of a system 100D comprising an I/O manager 120. The FIG. 1D embodiment may comprise a cache management system (CMS) 180 configured to manage VM cache data by use of I/O metadata 135, such as cache tags (e.g., data tags 184 as illustrated in FIG. 2 below). The CMS 180 may be configured to cache data of the VMs 114A-N operating on the host computing device 101. The CMS 180 manages separate sets of data tags 185A-N for respective VMs 114A-N. The data tags 185A-N may correspond to storage resources allocated to the VMs 114A-N. The CMS 180 may be further configured to manage sets of data tags 185X and/or 185Y corresponding to storage resources provisioned to other services and/or modules of the VM I/O manager 120, such as the interim storage module 122 (e.g., for use as scratch storage 138).

FIG. 2 depicts embodiments of I/O metadata 135, including embodiments of a set 185 of data tags 184. A data tag 184 may be configured to represent a storage location in the host storage resource 136 (e.g., a page, block, sector, or the like). The data tags 184 may be used to manage and/or reference ephemeral data, as disclosed herein. Alternatively, or in addition, data tags 184 may be used to manage data of the VMs 114A-N cached on the host storage resource 136. Accordingly, the data tags 184 may refer to ephemeral data tags and/or cache data tags. In some embodiments, data tags 184 may be used to manage shared file data, as disclosed in further detail herein.

The CMS 180 may allocate data tags 184 to the VMs 114A-N in accordance with the storage resources provisioned to the VMs 114A-N by the provisioner 132. The CMS 180 may be configured to add/remove data tags 184A-N in response to changes to VM storage allocations. The CMS 180 may be configured to add data tags 184A to VM 114A in response to the provisioner 132 increasing the storage allocated to VM 114A (either ephemeral storage and/or cache storage, as disclosed in further detail herein). The CMS 180 may remove data tags 184A in response to the provisioner 132 decreasing the storage allocation to VM 114A.

The CMS 180 may use data tags 184 to represent storage location(s), such that each data tag 184 corresponds to a respective storage unit of the host storage resource 136. Accordingly, the data tags 184 may be configured to associate data corresponding to a backing store (primary storage resource 160) with data cached in the scratch storage 138. A cache tag may comprise one or more fields, including, but not limited to: a primary storage identifier (PRID) field, a host storage identifier (HSID) field, a state field, a next field, and so on. The PRID field may comprise information configured to tie the data tag 184 to a storage resource (e.g., a primary storage volume, resource, and/or the like), as disclosed above. The HSID field may reference a storage location in the host storage resource 136. In some embodiments, data tags 184 may correspond to a set of contiguous virtual addresses. Accordingly, the HSID of a particular data tag 184 may be determined based on the offset and/or location of the data tag 184 in memory resource 103. A first data tag 184 in the set 185 (stored at memory offset 0) may correspond to virtual address 0, a second data tag 184 in the set 185 may correspond to virtual address 1, and so on. In such embodiments, the HSID field may be omitted from the data tag 184 data structure.

The state field may comprise information pertaining to a current state of the data tag 184, such as whether the data tag 184 is currently in use to reference data of the primary store (e.g., ephemeral data), is dirty, and/or the like. The state field may further include information pertaining to access and/or usage characteristics of the data tag 184 (e.g., read access characteristics, write access characteristics, last access time, access frequency, and so on), which may be used to, inter alia, identify data for eviction from scratch storage 138. The state field may be further configured to identify the VM 114A-N that originally admitted data of the data tag 184 into scratch storage 138, which may be used to prevent read-before-write conditions (e.g., prevent VM 114A from reading data admitted into the cache by another VM 114B-N). The state field may be further configured to indicate a persistence level for the data tag 184, which may include, but is not limited to, the cache mode for the data tag 184, such as write-through, write-back, write-never (discardable), ephemeral, removal trigger conditions, and/or the like. The next field may comprise a link and/or reference to a next data tag 184 in the set 185. In embodiments where the data tags 184 are arranged in memory resource 103 in a predetermined manner (stored contiguously), the next field may be omitted (e.g., may be derived from an offset from a current tag 184). Further embodiments of cache management systems and/or corresponding cache metadata are disclosed in U.S. patent application Ser. No. 13/028,149, entitled "Systems and Methods for Managing I/O Operations," filed Feb. 15, 2011, which is hereby incorporated by reference in its entirety.

In some embodiments, the data tags 184 may reference the host storage resource 136 by use of virtual addresses (e.g., indirect addresses). As used herein, a virtual address refers to an identifier of an intermediate mapping layer between the CMS 180 and the host storage resource 136. The CMS 180 and/or provisioner 132 may leverage the intermediate mapping layer to allocate contiguous ranges and/or extents of virtual addresses, regardless of the address and/or layout of the corresponding host storage resource 136. The translation module 134 may be configured to map virtual identifiers (e.g., interim identifiers) to virtual addresses and/or particular storage locations on the host storage resource 136.

Figure 3:
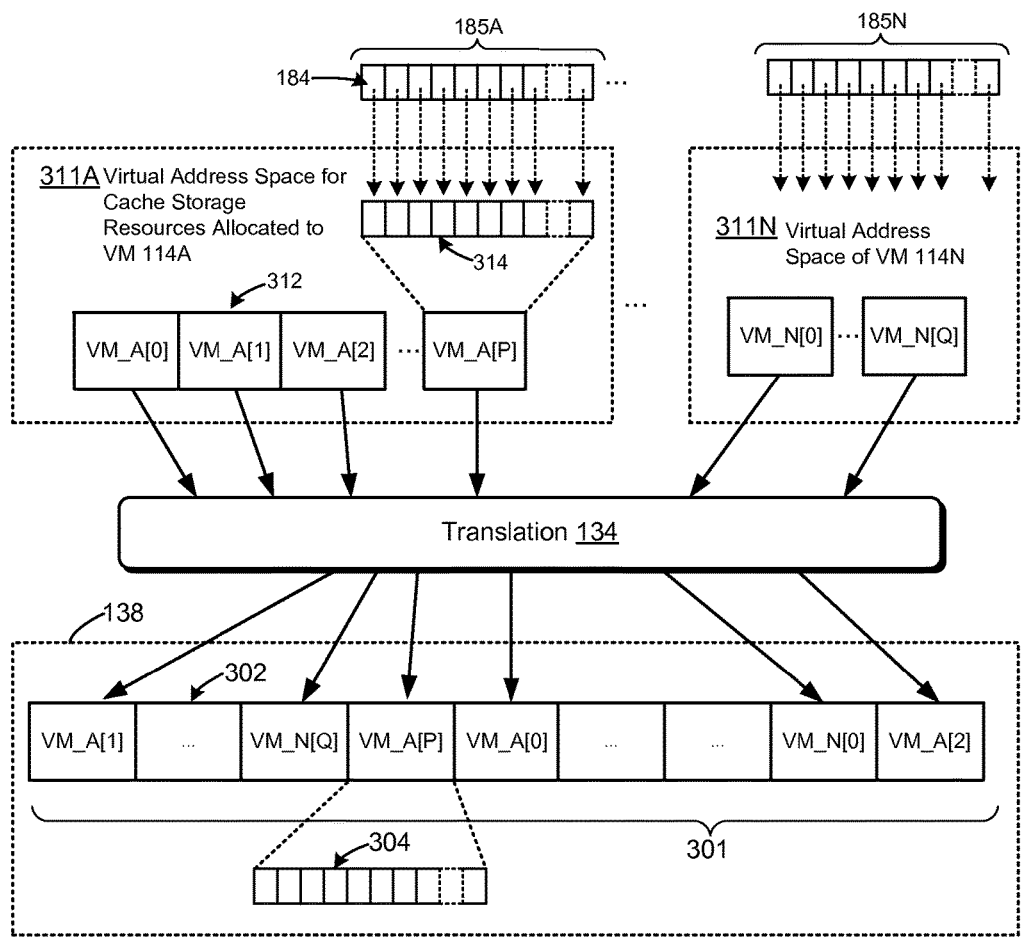
FIG. 3 is a block diagram that illustrates further embodiments of I/O metadata.

FIG. 3 depicts further embodiments of I/O metadata 135 corresponding to a translation layer between data tags 184 and the host storage resource 136. The host storage resource 136 may comprise a plurality of cache storage units 304, which may correspond to pages, blocks, sectors, storage divisions, erase blocks, logical pages (e.g., two or more pages), and/or the like.

As illustrated in FIG. 3, the provisioner 132 may be configured to partition the storage capacity of the host storage resource 136 into a plurality of chunks 302. As used herein, a chunk refers to an arbitrarily sized portion of storage capacity. A chunk 302 may comprise a set, range, and/or extent of storage units 304. In a particular embodiment, each chunk 302 corresponds to 256 MB (megabytes) of storage capacity, such that a host storage resource 136 having a capacity of 1 TB (terabyte) is divided into 4,192 chunks 302. As disclosed above, the chunks 302 may comprise a plurality of storage units 304 capable of persistently storing data. As disclosed herein, the translation module 134 may map chunks 302 to virtual addresses (virtual chunk addresses 312) within respective virtual address space(s) 311A-N.

The provisioner 132 may be configured to allocate chunks 302 for use by the CMS 180 to cache data of the VMs 114A-N (and/or for use as scratch storage 138 to store ephemeral data of the VMs 114A-N). The provisioner 132 may be configured to dynamically modify allocations in response to the I/O load on the host computing device 101, the VMs 114A-N, and/or the like. The number of chunks 302 allocated to a particular VM 114A-N may determine the cache storage capacity available to the CMS 180 to cache data of the VM 114A-N. Similarly, the number of chunks 302 allocated as ephemeral storage may determine the ephemeral storage capacity available to the VM 114A-N. The storage resources (chunks 302) may be allocated within a storage address space 301 of the host storage resource 136. Chunks 302 may be allocated according to availability, wear characteristics, reliability characteristics, and/or the like. Accordingly, the chunks 302 allocated to a particular VM 114A-N may be fragmented in the storage address space 301 (e.g., the chunks 302 may correspond to discontiguous and/or disjointed regions of the storage address space 301). In the FIG. 3 embodiment, the provisioner 132 has allocated chunks VM_A[0]-VM_A[P] to VM 114A; has allocated chunks VM_N[0]-VM_N[Q] to VM 114N, and so on. The allocations depicted in FIG. 3 may correspond to cache and/or ephemeral data storage.

The translation module 134 may be configured to provide a translation layer between virtual addresses 314 of the data tags 184 and storage units 304 within the storage address space 301 of the host storage resource 136 (and/or virtual chunk addresses 312 and chunks 302). The translation module 134 may allow storage resources to be managed as contiguous ranges and/or extents of virtual addresses 314. As illustrated in FIG. 3, the provisioner 132 may allocate cache resources to the VMs 114A-N within respective, contiguous virtual address spaces 311A-N (e.g., a range of virtual chunk addresses 312). The disclosure is not limited in this regard, however, and could be adapted to manage virtual addresses in other ways, such as allocating contiguous ranges of virtual addresses to the VMs 114A-N within a single logical and/or virtual address space. The translation module 134 is configured to map virtual addresses within virtual chunks 312 to respective cache storage units 304 within the chunks 302 of the storage address space 301. Accordingly, the storage resources provisioned to the VMs 114A-N (and/or other services of the I/O manager 120) may be represented as a contiguous range of virtual addresses 314, regardless of the arrangement of the underlying chunks 302 in the storage address space 301. As shown in FIG. 3, the virtual chunks provisioned to VM 114A (VM_A[0]-VM_A[P]) correspond to a contiguous range of virtual addresses in the virtual address space 311A, whereas the corresponding chunks 302 are distributed discontinuously throughout the storage address space 301.

In some embodiments, the CMS 180 is configured to cache data of the VMs 114A-N. The CMS 180 may be configured to use the data tags 184 to map and/or associate identifiers (I/O addresses) of cached data with the storage location of the data in the scratch storage 138. Alternatively, or in addition, the interim storage module 122 may use the data tags 184 to manage ephemeral data 139A-N of the VMs 114A-N stored in the scratch storage 138.

The translation module 134 is configured to translate virtual addresses associated the data tags 184 with respective storage units 304 within an address space of the host storage resource 136. In some embodiments, the data tags 184 are organized linearly in RAM or other memory resources 103 of the computing system 100, which may allow the virtual address of a data tag 184 to be derived from a memory location and/or offset of the data tag 184 (e.g., based on the assumption that each data tag 184 has a linear 1:1 correspondence with a virtual address and/or cache storage unit 304). Alternatively, or in addition, data tags 184 may be organized into another data structure, such as a hash table, tree, or the like. Each data tag 184 may be associated with a corresponding cache storage unit 304.

Referring back to FIG. 1D, the I/O manager 120 may be configured to service I/O requests 115 pertaining to ephemeral data (e.g., ephemeral I/O requests 116), as disclosed above. The I/O manager 120 may be further configured to service I/O requests 115 pertaining to non-ephemeral data by use of the CMS 180. Caching VM data may comprise identifying I/O requests 115 of the VMs 114A-N by, inter alia, monitoring the I/O stack 106 by use of the I/O monitor 121, as disclosed above. The I/O manager 120 may redirect I/O requests 115 pertaining to ephemeral data (e.g., ephemeral I/O requests 116) to the interim storage module 122, as disclosed above. Other I/O requests 115 may be directed to the CMS 180, which may service the I/O requests 115 by use of a cache storage 188. The cache storage 188 may comprise respective regions of storage capacity allocated to the VMs 114A-N (within the host storage resource 136), as disclosed above.

Figure 4:
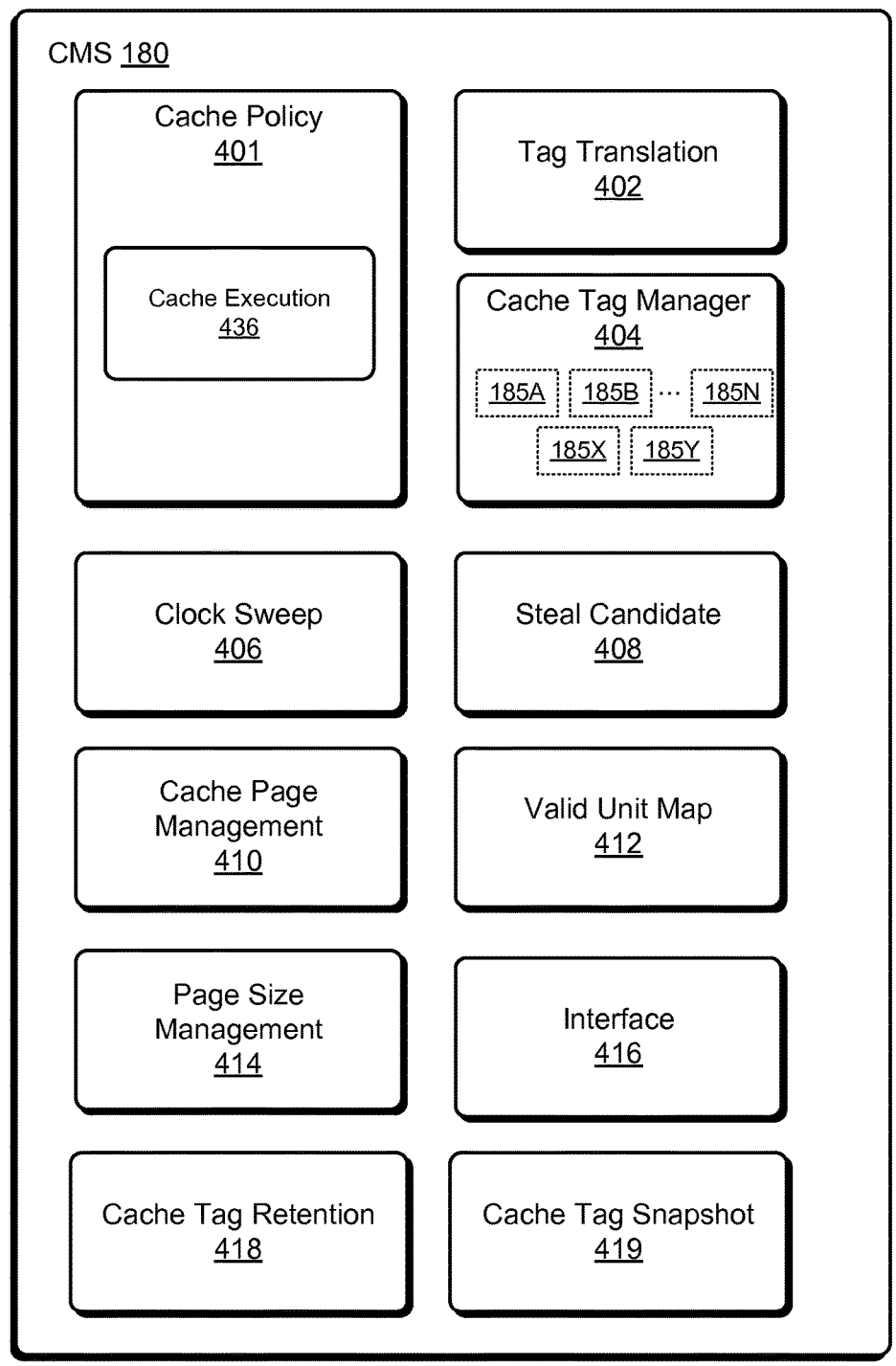
FIG. 4 is a block diagram of one embodiment of a cache management system.

FIG. 4 is a block diagram depicting one embodiment of a CMS 180. The CMS 180 may comprise one or more modules, including a cache policy module 401, a tag translation module 402, a cache tag manager 404, a clock sweep module 406, a steal candidate module 408, a cache page management module 410, a valid unit map module 412, a page size management module 414, an interface module 416, a cache tag retention module 418, and a cache tag snapshot module 419.

The cache policy module 401 may be configured to select data for admission into cache storage 188 based on various cache admission criteria and/or policies. The CMS 180 may further comprise a cache execution module 436, which may be configured to perform storage operations in the host storage resource 136 (by use of the storage module 130) including, but not limited to: writing data to the cache storage 188, modifying data stored in the cache storage 188, reading data from the cache storage 188, destaging data to a primary storage resource 160, and/or the like. The cache execution module 436 may be configured to manage cache data according to one or more cache modes and/or configurations; the cache execution module 436 may be configured to cache data in a write-through cache mode, which may comprise servicing write I/O requests 115 by writing data to the primary storage resource 160 and the cache storage 188. In a write-through cache mode, the CMS 180 may not acknowledge completion of the write I/O request 115 until the data is written to the primary storage resource 160.

The tag translation module 402 may be configured to correlate identifiers of the I/O requests 115 (e.g., primary identifiers of the VMs 114A-N, such as addresses corresponding to the primary storage resource 160) with virtual addresses, by use of the data tags 184. The virtual addresses of the data tags 184 may be mapped to cache chunks 302 and/or storage units 304 by use of the translation module 134, as disclosed above. The cache tag manager 404 may be configured to manage the sets of data tags 185A-N allocated to the VMs 114A-N (and/or other services), which may comprise maintaining associations between virtual machine identifiers (e.g., logical identifiers, addresses, primary storage addresses) and data in the cache storage 188, and maintaining cache metadata, such as access characteristics, persistence level, cache mode, and so on.

The clock sweep module 406 may be configured to determine and/or maintain cache aging metadata using, inter alia, one or more clock hand sweep timers. The steal candidate module 408 may be configured to identify cache data and/or cache tags that are candidates for eviction from the cache storage 188 based on, inter alia, clock sweep metadata or other cache policy. In some embodiments, the steal candidate module 408 may be configured to predicate cache tag eviction on persistence level metadata of the data tags 184. For example, the steal candidate module 408 may not select data tags 184 that are stored in disposable cache storage for eviction.

The cache page management module 410 may be configured to manage cache resources (e.g., cache chunks 302 and/or storage units 304) and related operations. The valid unit map module 412 may be configured to identify valid data stored in the cache storage 199 and/or a primary storage resource 160. The page size management module 414 may be configured to perform various page size analysis and adjustment operations to enhance cache performance. The interface module 416 may be configured to provide one or more interfaces to allow other components, devices, and/or systems to interact with the CMS 180.

The cache tag retention module 418 may be configured to retain the set of data tags 185A-N of a VM 114A-N in response to transferring the VM 114A-N to a different host (e.g., a different computing device 101). As disclosed in further detail herein, data corresponding to the retained set of data tags 185A-N may be transferred to the destination host from the cache storage 188, the primary storage resource 160, and/or other sources. The cache data may be transferred as the cache data of data tags 184 is requested at the destination host. Alternatively, or in addition, cache data may be prefetched and/or transferred in a bulk transfer operation, which may comprise transferring cache data independent of requests for the cache data. In some embodiments, cache data may be selectively prefetched based upon a cache transfer policy, which may be based on, inter alia, the cache aging metadata of the clock sweep module 406 or steal candidate module 408, and/or other cache policy metadata (e.g., hotness, coldness, least recently used, or the like). The cache tag snapshot module 419 may be configured to maintain one or more "snapshots" of the working set of the cache of a particular VM 114A-N (e.g., sets of data tags 185A-N). As used herein, a snapshot refers to the state of a set of data tags 185A-N at a particular time. The snapshot module 419 may be configured to store snapshots on a persistent storage medium and/or to load a stored snapshot from a persistent storage into the CMS 180.

The CMS 180 may be configured to cache data of the VMs 114A-N. Referring to FIG. 1D, caching VM data may comprise identifying I/O requests 115 of the VMs 114A-N by, inter alia, monitoring the I/O stack 106, and servicing the I/O requests 115 by use of the cache storage 188. The CMS 180 may be configured to service a read I/O request 115 from a particular VM 114A-N (e.g., VM 114A) by determining whether data corresponding to the I/O request 115 has been admitted into the cache and, if so, accessing the requested data stored in the cache storage 188. The CMS 180 may determine whether the requested data is available in the cache storage 188 by use of the set of data tags 185A provisioned to the VM 114A. The read I/O request 115 may include an identifier corresponding to the requested data (a PRID, as disclosed above). The primary identifier may include, but is not limited to: a name, an address, an identifier, a logical address, a logical block address (LBA), a back-end identifier, a LUN address, a vLUN address, a physical storage address, a disk address (e.g., cylinder, sector, or head address), a volume address, an SCSI address, and/or the like. The CMS 180 may determine whether the set of data tags 185A of the VM 114A includes a data tag 184 corresponding to the read I/O request 115 and, if so, may determine that the requested data is available in the cache storage 188. The CMS 180 may be further configured to access the requested data using the virtual cache address associated with the identified data tag 184.

If the set of data tags 185A does not include a cache tag corresponding to the I/O request 115 data, the CMS 180 may determine that the data has not been admitted into the cache storage 188 (a miss has occurred). In response to a cache miss, the CMS 180 may determine whether to admit the data into the cache storage 188 by use of, inter alia, the cache policy module 401. Admission into the cache storage 188 may be predicated on various admission policies and/or factors, such as the availability of data tags 184 in the set 185A allocated to the VM 114A, access characteristics of other data tags 184 in the set 185A (e.g., steal and/or eviction candidates), and/or the like. The CMS 180 may admit the data by assigning a data tag 184 to the data (e.g., setting a backing store identifier of the data tag(s) 184 to an identifier of the read I/O request 115), accessing the data in the primary storage resource 160, and writing the data to the cache storage 188 at the virtual cache address(es) corresponding to the cache tag(s) 184.

The CMS 180 may be further configured to service write I/O requests 115. Servicing a write I/O request 115 for a particular VM 114A-N (e.g., VM 114A) may comprise determining whether the write I/O request 115 pertains to an identifier that has been admitted into the cache storage 188 (e.g., by identifying a data tag 184 that corresponds to the write I/O request 115 in the data tag set 185A, as disclosed above). In response to determining that the write I/O request 115 corresponds to an identifier that has not been admitted into the cache storage 188 (a write miss), the CMS 180 may determine whether to admit the data into the cache storage 188, as disclosed above. Servicing the write I/O request 115 may comprise writing data of the I/O request 115 to the cache storage 188 by use of the cache execution module 436. Servicing the write I/O request 115 may further comprise writing the data to the primary storage resource 160, in accordance with a persistence level and/or cache mode assigned to the data.

Figure 5:
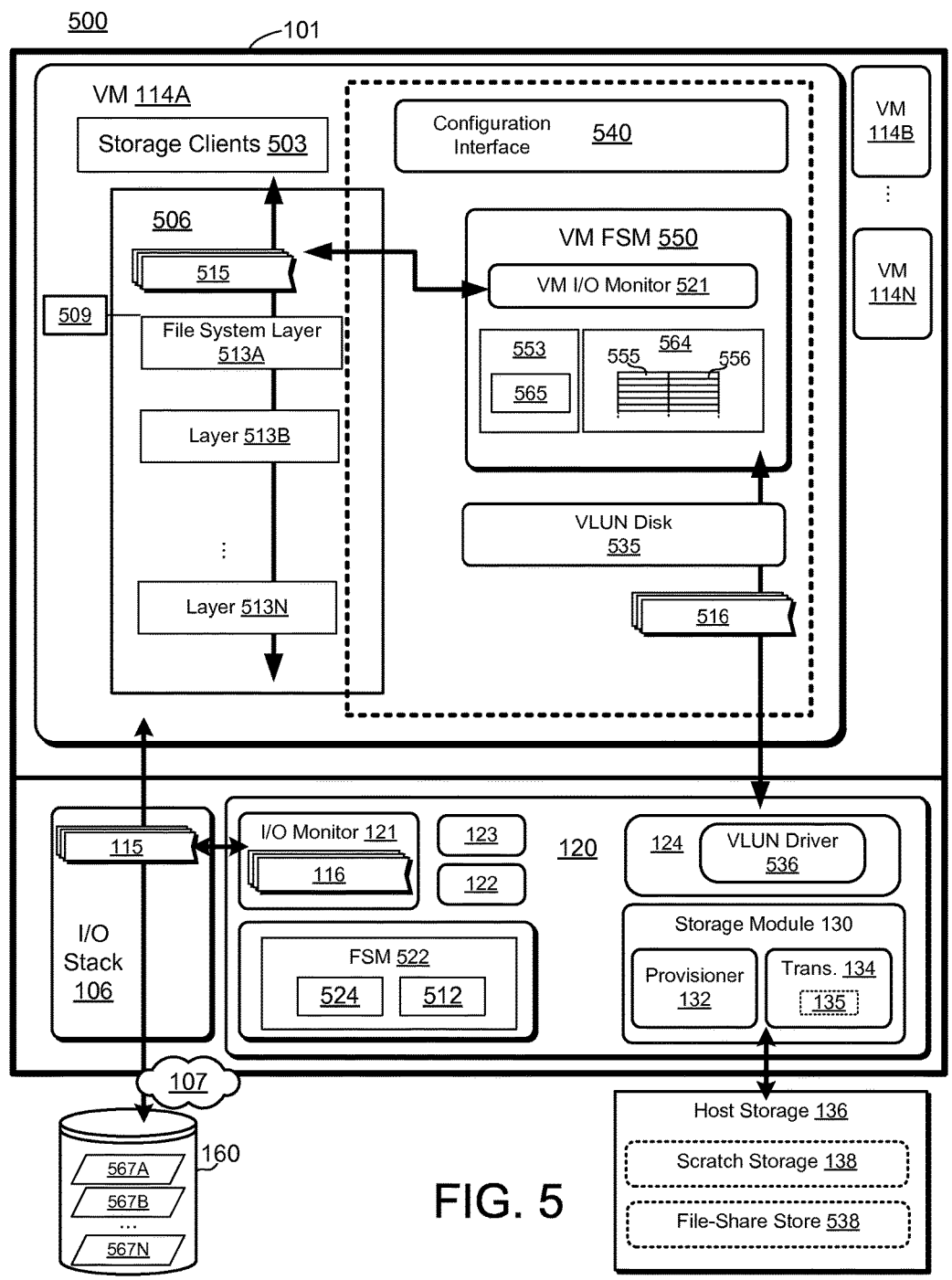
FIG. 5 is a block diagram of one embodiment of an I/O manager configured to manage ephemeral data and file sharing.

FIG. 5 is a block diagram of another embodiment of a system 500 comprising an I/O manager 120 configured to manage I/O operations of VMs operating on a host computing device 101. The I/O manager 120 of the FIG. 5 embodiment may comprise a file-share module (FSM) 522. The FSM 522 may be configured to manage file data common to two or more of the VMs 114A-N, which may comprise, inter alia, providing access to file data stored in the host storage 136 to two or more of the VMs 114A-N.

In some embodiments, the VMs 114A-N may share common I/O characteristics, which may strain the I/O infrastructure of the host computing device 101, primary storage resource 160, and/or network 107. The VMs 114A-N may share similar data sets (e.g., operating systems, applications, user profile information, or the like), and may be configured to access this common data at similar times (e.g., during boot-up, power-on, log-in time, or the like). The resulting "boot storms" may overwhelm the primary storage resource 160, the I/O infrastructure of the host computing device 101, and/or network 107, which may significantly degrade overall system performance. Similar file access storms may occur in response to the VMs 114A-N loading particular applications, accessing shared data, accessing user profile information, executing a login processes, and so on. Moreover, in some embodiments, the I/O manager 120 comprises a CMS 180, which may admit similar data sets into the cache storage 188, as disclosed herein, filling the cache storage 188 with duplicate data. The CMS 180 and cache storage 188 are not depicted in FIG. 5 to avoid obscuring the details of the illustrated embodiment.

The FSM 522 manages file data common to the VMs 114A-N. The provisioner 132 may be configured to allocate resources to the FSM 522 for use as, inter alia, file-share storage 538. The provisioner 132 may be configured to allocate cache storage capacity (e.g., chunks 302) for use as file-share storage 538, as disclosed herein. The file-share storage 538 may be provisioned within the host storage resource 136 with the scratch storage 138 and/or in separate storage resources. The translation module 134 may be configured to map virtual addresses of the storage resources allocated to the file-share storage 538 to data identifiers using, inter alia, I/O metadata 135, as disclosed herein (e.g., data tags 184).

As depicted in FIG. 5, the host computing device 101 may be configured to host a plurality of VMs 114A-N. The VMs 114A-N may comprise a VM file share module (VM FSM) 550, which may include a VM I/O monitor 521 configured to monitor VM I/O requests 515 within the respective VMs 114A-N (within the storage stack 506 of the respective VMs 114A-N). The VM I/O monitor 521 may comprise an I/O driver, filter driver, and/or the like, as disclosed herein. The VM I/O monitor 521 may comprise a multi-level and/or file-level I/O monitor configured to monitor I/O requests 515 at various layers 513A-N of the storage stack 506. The VM FMS 550 may be configured to maintain layer-specific metadata pertaining to I/O requests 515 pertaining to the layer(s) 513A-N. Further embodiments of file-level and multi-level caching are disclosed in U.S. patent application Ser. No. 13/287,998 to Joshi Vikram et al., filed Nov. 2, 2011, entitled, "Systems and Methods for a File-Level Cache," which is hereby incorporated by reference in its entirety.

The VM FSM 550 may be configured to identify data suitable for admission into the file-sharing storage 538 (managed by the FSM 522). Data suitable for admission into the file-share storage 538 may include file data that is used within multiple VMs 114A-N and is "stable" (e.g., the data is rarely updated and/or modified). The VM FSM 550 may be configured to identify data suitable for admission by monitoring I/O requests 515 within the storage stack 506 of the VMs 114A-N using, inter alia, the VM I/O monitor 521 and/or a file-share policy module 553. The VM I/O monitor 521 may include, but is not limited to: a driver, a storage driver, a filter driver, and/or the like. In some embodiments, the VM FSM 550 may operate at a file layer 513A of the storage stack 506 and, as such, may be configured to monitor I/O requests 515 pertaining to file operations within the VM 114A. Alternatively, and/or in addition, the VM I/O monitor 521 may monitor I/O requests 515 within other layers 513B-N of the storage stack 506, such as a volume layer, disk layer, SCSI layer, and/or the like.

The file-share policy module 553 may be configured to identify files suitable for admission into the file-share storage 538 based on, inter alia, a file-share admission policy 565. The file-share admission policy 565 may include file selection criterion, which may include, but is not limited to: file-name matching, extension matching, volume matching, disk matching, inclusion lists, exclusion lists, and the like. The file selection criterion may comprise dynamic and/or learned criteria. For example, in some embodiments, the file-share policy module 553 may be configured to monitor file I/O access patterns within respective VMs 114A-N (accessed by various storage clients 503) to dynamically identify files suitable for admission into the file-share storage 538. For example, the file-share policy module 553 may be configured to monitor file access frequencies for one or more of write operations and read operations. Files subject to multiple read operations (and few, if any, write operations) may be selected for admission into the file-share storage 538. In some embodiments, the file-share policy module 553 may select files for admission in response to properties of the I/O request 515, API calls, and/or other messages. An I/O request issued by the storage client 503 may, for example, include flags and/or other metadata indicating that the corresponding data should be admitted into the file-share storage 538. Alternatively, or in addition, the VM FSM 550 may be configured to receive admission configuration and/or hints through a configuration interface 540. The configuration interface 540 may be configured to receive file-share admission policy information through one or more of: dedicated APIs, block device interface calls, I/O requests, fadvise calls, IOCTL calls, fallocate calls, parameters, flags, and the like.

The file-share policy module 553 may be configured to prevent data from being redundantly cached in multiple cache layers, which may comprise preventing data that has been admitted into the file-share storage 538 from being admitted into a cache storage (e.g., cache storage 188). Data admitted into the file-share storage 538 may be omitted from cache storage 188 managed by the CMS 180, as disclosed herein.

FIG. 6 depicts one embodiment of a file-share admission policy 565 comprising file selection criteria. The file-share admission policy 565 may comprise pattern matching and/or wildcard criteria. As illustrated in FIG. 6, files having a ".sys" extension are identified as suitable for admission into the file-share storage 538, and files having a ".dat" extension should be excluded. The file-share admission policy 565 may identify suitable files based upon a volume and/or portions of a qualified file name. As illustrated in FIG. 6, files in a "windows\system32" or "\windows\system" path are suitable for de-duplication, whereas files in the "working_files" directory are excluded. The file-share admission policy 565 may identify specific files (e.g., corporate_template.doc), file patterns, volumes, drives, and/or the like. In some embodiments, the file-share admission policy 565 may identify files suitable for admission into the file-share storage 538 based on application-level knowledge (e.g., based on the application and/or storage client 503 associated with an I/O request). In one embodiment, certain applications may access file data in a read-only mode. The file-share admission policy 565 may indicate that files accessed by such applications are suitable for admission into the file-share storage 538 (e.g., files accessed by "Application X" are admittable). The file-share admission policy 565 may be further configured to specify files for admission into (or exclusion from) the file-share storage 538 by use of file attributes. As illustrated in FIG. 6, files comprising a particular attribute value "X" may be suitable for admission (e.g., a read-only flag). Although particular examples of file-share admission policy 565 are illustrated herein, the disclosure is not limited in this regard and could incorporate any suitable file selection criteria, including, but not limited to: pattern matching, regular expressions, expert systems, I/O access modes, fadvise information, fallocate information, I/O control (IOCTL) information, and so on.

Referring back to FIG. 5, the VM FSM 550 may be configured to a) monitor VM I/O requests 515 (by use of the VM I/O monitor 521) and b) identify I/O requests 516 pertaining to files that are suitable for the file-share storage 538 using, inter alia, the file-share policy module 553. The VM FSM 550 may be further configured to service the identified I/O requests 516 by use of the FSM 522 operating in the virtualization infrastructure 110 (hypervisor). In some embodiments, the VM FSM 550 is configured to redirect the identified I/O requests 516 to the FSM 522 by use of a VLUN disk 535 presented in the VM 114A by use of a VLUN driver 536. Alternatively, or in addition, the VM FSM 550 may be configured to tag the identified I/O requests 516 to enable the I/O requests 516 to be identified in the storage stack 506 by the VM I/O monitor 521, as disclosed above. VM FSM 550 may be configured to provide additional metadata pertaining to the identified I/O requests 516. In some embodiments, the VM FSM 550 includes a data identifier (DID) 556 with the identified I/O requests 516, which may enable the FSM 522 to a) determine whether the corresponding file data exists in the file-share storage 538 and/or b) access a file-share tag 512 corresponding to the file data.

The VM FSM 550 may be configured to maintain file-share metadata pertaining to data that has been admitted into the file-share storage 538. The metadata may include a file-share dictionary 564. The file-share dictionary 564 may comprise an index configured to associate unique file identifiers (UFIDs) 555 of the particular VM 114A with context-free DIDs 556. A UFID 555 may uniquely identify a file with respect to the particular VM 114A-N (e.g., uniquely identify the file within the namespace of the file system and/or operating system of VM 114A). The UFID 555 of a file may comprise a combination of the name of the file and a volume identifier (VID), which comprise a volume GUID, volume name, or the like (e.g., "\\VID:\windows\system32\kernel32.dll"). Files may be further identified by use of a context-independent identifier. As used herein, a context-independent or context-free identifier refers to an identifier that is independent of the namespace of the particular VM 114A-N. The context-independent and/or context-free identifier may be used to allow different VMs 114A-N to share access to data in the file-share storage 538. In some embodiments, the context-independent identifier comprises a DID 556, which may be derived from the contents of the file (e.g., file data). The DID 556 may include, but is not limited to: a hash value (e.g., SHA-1, MD5, or the like), a checksum, a Cyclic Redundancy Check (CRC) value, CRC32, a signature, or the like. Accordingly, a context-independent identifier and/or DID may comprise and/or be referred to as a file signature. Generating the DID 556 of file data may comprise reading at least a portion of the file data (e.g., contents of the file) and using the file data to generate the DID 556 (e.g., by hashing the file data, signing the file data, processing the file data, or the like). The DID 556 of a file may be common to the VMs 114A-N and/or file-share storage 538. Accordingly, the DID 556 of a file may comprise a context-free and/or universal identifier of the file, which may be used to reference the file data by the FSM 522 and/or any VM 114A-N of any host computing device 101.

The FSM 522 may be configured to admit file data into the file-share storage 538 in response to admission request(s) from the VMs 114A-N. The FSM 522 may be configured to index file data by use of a set of file-share tags 512 (or file catalog). As disclosed in further detail herein, the file-share tags 512 may be configured to map and/or index file data stored in the file-share storage 538 thereto by use of context-independent identifiers, such as DIDs 556, which may allow different VMs 114A-N, having different file naming conventions and/or file paths, to access file data within the file-share storage 538. For example, the UFID of "kernel32.dll" on the VM 114A may be referenced by "\\VID_1\windows\system32\kernel32.dll," which may differ from the UFID on another VM 114B-N (e.g., the UFID of "kernel32.dll" on VN 114B may be "\\VID_2: \windows_install\system32\kernell32.dll"). However, since the DIDs 556 are derived from the file data, as opposed to file name and/or path information, the DIDs 556 used by the VMs 114A-N that reference "kernel32.dll" may be the same.

As disclosed above, the file-share dictionary 564 maintained within the respective VMs 114A-N by respective VM FSMs 550, may be configured to associate the UFID 555 of files that have been admitted into the file-share storage 538 with respective DIDs 556. The file-share dictionary 564 may be implemented using any suitable data structure, including, but not limited to: a tree, hash table, linked list, lookup table, content addressable map (CAM), or the like. FIG. 7 depicts one embodiment of a file-share dictionary 564. The file-share dictionary 564 of FIG. 7 associates virtual-machine-specific UFIDs 555 with corresponding context-independent DIDs 556 (represented in Hex format). As disclosed above, the UFIDs 555 may correspond to a UFID of a particular VM 114A-N (e.g., a fully qualified file name), and the DIDs 556 may comprise a context-independent identifier of the files, which may be derived from the contents of the file. The VM FSM 550 may be configured to identify files that have been admitted into the file-share storage 538 by use of the UFIDs 555 and to reference the data by use of the corresponding context-independent DIDs 556.

Referring to FIG. 5, the FSM 522 may manage the contents of the file-share storage 538 by admitting file data of the VMs 114A-N into the file-share storage 538 and providing access to the stored file data to two or more of the VMs 114A-N. The provisioner 132 may allocate storage capacity (e.g., chunks 302 and/or 312) to the FSM 522 for use in storing file data of the VMs 114A-N. The FSM 522 may manage the storage capacity allocated thereto using, inter alia, data tags 184, as disclosed above, and/or file-share tags 512. The FSM 522 may use the file-share tags 512 to map context-independent identifier(s) of file data admitted into the file-share storage 538 (e.g., the DID 556 disclosed herein) to storage locations of the corresponding file data in the file-share storage 538. The file-share tags 512 may correspond to the capacity allocated to the FSM 522 by the provisioner 132 (e.g., each file-share tag 512 may correspond to a respective cache chunk 302 and/or 312). The FSM 522 may dynamically add and/or remove file-share tags 512 in response to allocation operations of the provisioner 132, as disclosed herein. The file-share tags 512 may be maintained in any suitable data structure, including, but not limited to, contiguous memory, a table, a tree, or the like. FIG. 8 depicts one embodiment of a set of file-share tags 512. As illustrated in FIG. 8, the file-share tags 512 may be configured to associate DIDs 556 of files and/or file data admitted into the file-share storage 538 with respective storage locations 857 of the file data within the host storage resource 136 (e.g., file-share storage 538). The storage locations 857 may comprise references to virtual addresses that are translated to physical addresses by the translation module 134, as disclosed herein. Alternatively, the storage locations 857 may comprise physical cache addresses that directly reference data stored in the file-share storage 538. Like the data tags 184 disclosed herein, the file-share tags 512 may comprise additional metadata (not shown), such as access metrics, timer data, and so on, which may be used to manage admission to and/or eviction from the file-share storage 538. The file-share tags 512 may further comprise identifiers of VMs 114A-N (VMIDs) 859 associated with the file data that has been admitted into the file-share storage 538. As disclosed in further detail herein, the VMIDs 859 may be used to secure data admitted into the file-share storage 538 and/or prevent read-before-write hazards.

Referring back to FIG. 5, as disclosed herein, the VM FSM 550 may be configured to a) identify I/O requests 516 pertaining to files suitable for admission into the file-share storage 538, and b) determine whether data of the I/O requests 516 has been admitted into the file-share storage 538. The VM FSM 550 may determine whether data of an identified I/O request 516 has been admitted into the file-share storage 538 by use of the file-share dictionary 564. If the file-share dictionary 564 comprises a valid entry corresponding to the UFID 555 of a file corresponding to the I/O request 516, the VM FSM 550 may attempt to service the request using the file-share storage 538, which may comprise requesting the data from the file-share storage 538 using the corresponding DID 556 in the file-share dictionary 564. Referring to FIG. 7, the VM FSM 550 may request file data of "VID\windows\system32\kernel32.dll" from the FSM 522 using the corresponding DID 556 "EA733BA0."

The FSM 522 may receive I/O requests 516 pertaining to file data in the file-share storage 538 from the VMs 114A-N. The I/O requests 516 may be received directly through the VLUN driver 536 (issued through the corresponding VLUN disk 535 within the respective VM 114A-N) and/or by monitoring the I/O stack 106, as disclosed herein. The I/O requests 516 may include and/or reference a DID 556 (the DID 556 may be determined by the VM FSM 550 of the corresponding VM 114A-N). In response to an I/O request 516, the FSM 522 may determine whether data corresponding to the request is available in the file-share storage 538 by use of the file-share tags 512. The FSM 522 may attempt to reference a file-share tag 512 that corresponds to the DID 556 of the I/O request 516. If a valid file-share tag 512 exists, the FSM 522 may access the corresponding file data in the file-share storage 538 and provide the data to the VM FSM 550 in response to the I/O request 516. If the file-share storage 538 does not have the requested data (e.g., a valid file-share tag 512 corresponding to the DID 556 does not exist), the FSM 522 may signal a "miss" indication (or other error code). In response, the VM FSM 550 may attempt to admit the file data into the file-share storage 538. Admitting the data may comprise reading data of the file from primary storage resource 160 (or another storage resource), determining a DID 556 of the file data, and issuing a request to admit the file data to the file-share storage 538 (e.g., by issuing a file data admission I/O request 516 to the FSM 522). The admission request may include the file data and the corresponding DID 556. The VM FSM 550 may be configured to generate the admission request in a separate thread and/or process that is outside of the critical path of the original I/O request 515 in the storage stack 506 and/or I/O stack 106. As used herein, the critical path of an I/O request 515 and/or 116 refers to the sequence of operations that contribute to the latency of the request. Since admitting the data into the file-share storage 538 is performed in a separate thread and/or process, the I/O request 515 can be serviced normally and may not significantly impact the performance of the I/O request.

In some embodiments, the VM FSM 550 may be configured to admit portions of a file into the file-share storage 538. A file-share policy module 524 may determine the maximum size for files admitted into the file-share storage 538. The VM FSM 550 may determine whether the file exceeds the maximum file size and, if so, may attempt to admit only a portion and/or chunk of the file. For example, a large file "large.dll" may be segmented into 16 chunks, which may be identified by a relative index: "large1.dll," "large2.dll," and so on. The file-share tags 512 may comprise separate entries (and corresponding DIDs 556) for each segment of the file. The VM FSM 550 may attempt to admit the various portions of the file as needed (e.g., in response to I/O requests 516 pertaining to various portions of the file). The file-share policy module 524 may be configured to selectively admit file data into the file-share storage 538 in response to requests from the VMs 114A-N. The file-share policy module 524 may determine whether to admit data into the file-share storage 538 based on various factors, which may include, but are not limited to: resource availability, access metrics (e.g., how many different VMs 114A-N have requested the file data and/or access metrics of the requests), and so on.

In response to determining to admit data, the FSM 522 may be configured to: allocate one or more file-share tag(s) 512 for the request; associate the allocated file-share tags 512 with the DID(s) 556 of the request; and provide for storing the file data in the file-share storage 538 (in association with the virtual addresses of the corresponding file-share tags 512). Admitting the data may further comprise providing an indication to the VM FSM 550 that the data was successfully admitted into the file-share storage 538. In response to the indication, the VM FSM 550 may update the VM file-share dictionary 564, which may comprise adding an entry to associate the UFID 555 of the file with the corresponding DID 556. The VM FSM 550 may be further configured to indicate that the file is being managed by the FSM 522 in the file-share storage 538 so that other I/O services and/or cache layers do not redundantly cache data of the file.

If the admission request is not satisfied, due to cache policy or an error condition, the FSM 522 may return an error code (or other indication) to the VM FSM 550. In response, the VM FSM 550 may remove entries corresponding to the DID(s) 556 of the admission request from the file-share dictionary 564 (if any) and/or indicate to other I/O services and/or cache layers that the file has not been admitted into the file-share storage 538.

As disclosed herein, each VM 114A-N may reference file data using the same, context-free DID 556 values. Referring to FIG. 8, each VM 114A-N may reference the file data of "kernel32.dll" using the same DID 556 "EA733BA0." Accordingly, each VM 114A-N that accesses "kernel32.dll," and determines that "kernel32.dll" is suitable for admission into the file-share storage 538, will attempt to admit the file using the same DID 556 "EA733BA0." When each VM 114A-N attempts to access "kernel32.dll" for the first time, the VM file-share dictionary 564 of the respective VM 114A-N will not include an entry for the file. Therefore, the VM FSM 550 will attempt to admit the file into the file-share storage 538, which, as disclosed above, may comprise reading the file "kernel32.dll," calculating the DID 556 ("EA733BA0"), and issuing a request to admit the file data to the file-share storage 538. Accordingly, the file-share storage 538 may receive many different requests to admit the same data (e.g., data associated with the same DID 556).

In response to a request to admit file data corresponding to a particular DID 556, the FSM 522 may determine whether data corresponding to the DID 556 has already been admitted (by a different VM 114A-N) by, inter alia, reference to the file-share tags 512. If a valid file-share tag 512 associated with the DID 556 already exists, the FSM 522 may determine that the file data of the admission request has already been admitted. The FSM 522 may acknowledge the admission request without re-admitting the file data. The FSM 522 may, however, update the file-share tag(s) 512 to indicate that corresponding VM 114A-N is authorized to read the file data from the file-share storage 538 (e.g., update the VMID 859 of the file-share tag(s) 512).

In some embodiments, VM FSM 550 is configured to verify that the existing file data in the file-share storage 538 matches the file data in the admission request. This verification may be used to prevent errors due to DID collisions. As used herein, a DID collision refers to a situation in which different file data results in the same DIDs 556. DID collisions may result from using shorter, less complex DIDs 556. The size and/or complexity of the DIDs 556 may be a tradeoff between a) the overhead needed to calculate, communicate, and/or store the DIDs 556 and b) the probability of DID collisions. Although large, complex DIDs 556 may significantly reduce the likelihood of DID collisions, the overhead of such DIDs 556 may be undesirable. In some embodiments, the size and/or complexity of the DIDs 556 may be based on, inter alia, the number of unique files (and/or file versions) that may be admitted into the file-share storage 538. Embodiments that require fewer unique files and/or file versions may be configured to use less complex and/or smaller DIDs 556. Embodiments that require a relatively large number of unique files and/or file versions may be configured to use large, more complex DIDs 556. The size of the DIDs 556 and/or other configuration information may be managed by use of the configuration interface 540 and/or file-share policy module 524.

In some embodiments, the FSM 522 may be configured to verify that matches between two or more DIDs 556 are not due to a DID collision. Verifying DIDs 556 may comprise comparing the file data from which the DIDs 556 were determined (e.g., a byte-by-byte comparison). Accordingly, in response to determining that the DID 556 of an admission request matches the DID 556 associated with a valid de-duplication file-share tag 512, the FSM 522 may be configured to verify that the underlying file data matches by, inter alia, comparing the data in the admission request to the data in the file-share storage 538; comparing stronger hash, signature, and/or CRC values; or the like. If the match is due to a collision, the file-share storage 538 may be configured to return an error to the VM FSM 550 indicating that the admission request could not be satisfied. Alternatively, the file-share storage 538 may be configured to admit the data using an alternative DID 556, and may provide the alternative DID 556 to the VM FSM 550 in response to successfully writing the data into the file-share storage 538. The alternative DID 556 may be generated in a deterministic manner, such that subsequent requests (from VM FSM 550 of other VMs 114A-N) will also result in the same alternative DID 556. The alternative DID 556 may be derived from the original DID 556 and/or may be derived from the file data itself. For example, the alternative DID 556 may be calculated using an alternative hash, signature, or other algorithm. Alternatively, or in addition, the alternative DID 556 may comprise a two-part identifier, comprising a first portion derived from the original DID 556 and a second portion generated by the file-share storage 538 and/or VM FSM 550.

As disclosed above, in response to receiving an acknowledgement that the admission request was satisfied, the VM FSM 550 may update the VM file-share dictionary 564 to associate the file UFID 555 with the corresponding DID 556 (or alternative DID 556). The VM FSM 550 may service subsequent I/O requests pertaining to the file by use of the file-share storage 538, which may comprise: a) identifying I/O requests 516 pertaining to the file, b) determining that the file has been admitted into the file-share storage 538 in reference to the VM file-share dictionary 564 (e.g., matching the UFID of the file to a valid entry in the file-share dictionary 564), c) requesting data to satisfy the I/O request 516 from the file-share storage 538, and d) satisfying the I/O request 516 using data provided by the file-share storage 538. The VM FSM 550 may, therefore, redirect I/O requests 516 directed to the primary storage resource 160 to the FSM 522, which may remove the load and/or I/O overhead from the primary storage resource 160, network 107, and/or the like.

In some embodiments, VM FSM 550 is configured to store the file-share dictionary 564 (e.g., a snapshot 567A) on a persistent storage medium, such as the primary storage resource 160 and/or the like. As disclosed above, a snapshot refers to current-state information regarding the data that has been admitted into the file-share storage 538 by the particular VM 114A-N. Accordingly, storing a snapshot 567A of the VM FSM 550 may comprise storing the entries comprising file-share dictionary 564 of the VM 114A, such as the UFIDs 555 and DIDs 556 of the data that has been admitted into the file-share storage 538 by the VM 114A. Other VMs 114A-N may be configured to store respective snapshots 567B-N. The snapshots 567A-N may be persisted in any suitable format, including, but not limited to: a file, a configuration repository such as a registry or persistent settings, a database, cache storage, or the like.

In some embodiments, the VM FSM 550 is configured to load a corresponding snapshot 567A-N after the corresponding VM 114A-N undergoes a reboot, restart, power-cycle, and/or host transfer operation. Loading the snapshot 567A-N may comprise populating the file-share dictionary 564 of the VM 114A-N with the UFIDs 555 and corresponding DIDs 556 of the files that have been admitted into the file-share storage 538 by the respective VM 114A-N. Therefore, when the VM 114A-N restarts, the VM FSM 550 may access data of files admitted into the file-share storage 538 rather than accessing the primary storage resource 160, which may reduce the effects of the "boot storm" caused by multiple VMs 114A-N attempting to simultaneously access file data.

As disclosed above, the contents of the file-share storage 538 may be shared between multiple VMs 114A-N. As such, the file-share storage 538 and/or VM FSM 550 may be configured to manage modifications to files admitted to the file-share storage 538, since such modifications could adversely affect other VMs 114A-N that are accessing the files. Accordingly, in some embodiments, the file-share storage 538 may be configured to operate in a "read-only" mode, such that data cannot be modified after admission.

In some embodiments, VM FSM 550 is configured to monitor I/O requests within the VM storage stack 506 to identify requests to modify files that have been admitted into the file-share storage 538. In response to identifying such a request, the VM FSM 550 may be configured to invalidate the file-share dictionary entry (or entries) corresponding to the file in the file-share dictionary 564. The VM FSM 550 may be further configured to update the corresponding snapshot 567A-N. Accordingly, subsequent I/O requests pertaining to the file may operate against the primary storage resource 160. The VM FSM 550 may be further configured to inform the FSM 522 that the file is no longer in use by the VM 114A-N. In response, the FSM 522 may remove the VMID of the VM 114A-N from the corresponding file-share tags 512 (remove the VMID 859 of the entry corresponding to the file).

As disclosed above, the provisioner 132 may be configured to dynamically allocate storage resources to the FSM 522 in response to, inter alia, the I/O requirements of the VMs 114A-N. The FSM 522 may be configured to manage the contents of the file-share storage 538 in response to the resources allocated thereto. Managing the file-share storage 538 may include, but is not limited to: a) selectively admitting (and/or denying admission) to the file-share storage 538, b) maintaining access metrics, such as least recently used (LRU), steal timer, or the like, and/or c) removing file data from the file-share storage 538. The FSM 522 may remove file data in response to capacity constraints, aging, resource allocation changes, or the like. Alternatively, or in addition, file data may be removed in response to a request from an external entity (via the configuration interface 540 and/or file-share policy module 524). For example, file data in the file-share storage 538 may be corrupt or comprise a virus, Trojan, or the like. In response to detecting a problem with file data, the FSM 522 (or other entity) may remove the data. Removing the data may include, but is not limited to: invalidating and/or erasing the data from the host storage resource 136, removing file-share tags 512 corresponding to the data, and so on. Subsequent requests for the data may, therefore, result in a cache miss, which may result in readmission of the data into the file-share storage 538, as disclosed herein.

In some embodiments, the FSM 522 is configured to secure data stored therein. Securing the data may comprise preventing read-before-write hazards. As used herein, a read-before-write hazard refers to an attempt by an entity to read data that was not written thereby (and/or data that the entity is not authorized to access). In the FIG. 8 embodiment, a read-before-write hazard may comprise a VM 114B attempting to read a file that was admitted into the file-share storage 538 by VM 114A. As disclosed above, the file-share tags 512 may comprise an access list configured to identify the VMs 114A-N that are authorized to access particular files. Referring to FIG. 8, the VMIDs 859 of the de-duplication file-share tags 512 may identify the VMs 114A-N that are authorized to access particular file data. The FSM 522 may determine that a VM 114A-N is authorized to access a file in response to determining that the VM 114A-N has access to the underlying file data (e.g., access to the file on the primary storage resource 160). The FSM 522 may, therefore, determine that a VM 114A-N is authorized to access a particular file in response to the VM 114A-N admitting (and/or attempting to admit) the file into the file-share storage 538, as disclosed herein. Referring to FIG. 8, the FSM 522 may restrict access to file "45AD342E" to VM 114B; VM 114A and VM 114C-N may be prevented from accessing this data until they attempt to admit data having DID "45AD342E" into the file-share storage 538.

In some embodiments, the read-before-write security restrictions may be lifted or relaxed. For example, when admitting file data into the cache, a VM 114A-N may indicate that the file data is "public" and may be accessed without restriction. For example, system files, such as "kernel32.dll" may be specified as "public." Public access may be denoted with a wildcard indicator in the access list, or the like (e.g., data of DID "20AE45EA" may be publicly accessible). Allowing unrestricted access to file data may be advantageous in certain situations. For example, and as disclosed above, after being transferred to another host, the VM 114A-N may load a snapshot 567A-N of the file-share dictionary 564. However, the VM 114A-N may not have attempted to admit the referenced files on the destination host and, as such, may not appear on the access list(s) maintained by the FSM 550 of the destination host, meaning that the VM 114A-N would have to attempt to re-admit the file(s) at the destination host before having access to the file(s). If the files are marked as publicly accessible, the VM 114A-N may immediately access the files at the destination host without further accesses to the primary storage resource 160, which, as disclosed above, may ameliorate boot storm issues when the VM 114A-N reboots, restarts, and/or is power-cycled as part of the transfer. Alternatively, or in addition, when a VM 114A-N is migrated to another host, the previous host may provide file-share metadata pertaining to the VM 114A-N to the destination host. The destination host may use the metadata to authorize the VM 114A-N to access data in the file-share storage 538 of the destination host. The file-share metadata may include the DIDs 556 of file data the VM 114A-N is authorized to access (e.g., the file-share tags 512 pertaining to the particular VM 114A-N). Further embodiments of systems and methods for file sharing are disclosed in U.S. patent application Ser. No. 13/750,904, entitled "Systems and Methods for a De-Duplication Cache," filed Jan. 25, 2013 for Vikram Joshi et al., which is hereby incorporated by reference in its entirety.

Figure 9:
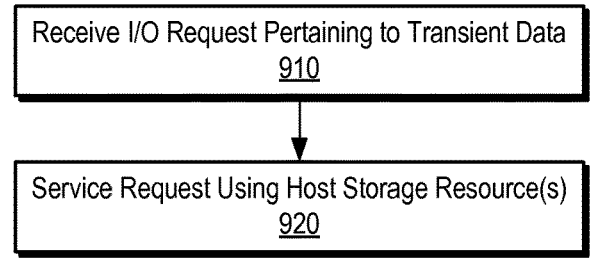
FIG. 9 is a flow diagram of one embodiment of a method for managing virtualized I/O.

FIG. 9 is a flow diagram of one embodiment of a method 900 for managing virtualized I/O. In some embodiments, one or more of the steps of the method 900 may be embodied as computer-readable instructions stored on a storage medium. The instructions may be adapted to configure a computing device to perform one or more steps of the method 900 (and/or other methods and/or processes disclosed herein). Alternatively, or in addition, steps of the method 900 and/or other methods disclosed herein may be implemented by use of particular machine components and/or modules, including, but not limited to: processors, controllers, communication interfaces, buses, and/or the like.

Step 910 may comprise receiving I/O requests pertaining to transient data of a VM 114A-N. Step 910 may comprise monitoring I/O requests 115 of an I/O stack 106, as disclosed herein. Step 910 may further comprise identifying I/O requests 116 pertaining to transient data based on a policy, selection criterion, filter criterion, and/or the like. In some embodiments, the VMs 114A-N may be configured to tag transient I/O requests 116, which may comprise one or more of: including metadata in the I/O requests 116; setting properties and/or parameters of the I/O requests 116; and directing the I/O requests 116 to a designated volume, disk, and/or the like (e.g., virtual disks 171A-N). The I/O requests 116 of step 190 may be directed to and/or reference a primary storage resource 160, such as a storage resource 165 and/or storage volume 167, as disclosed herein.

Step 920 may comprise servicing the I/O requests 116 received at step 910 by use of a storage resource of the host computing device 101, such as the host storage resource 136. The host storage resource 136 may be separate from and/or independent of the primary storage resource 160 corresponding to the I/O requests 116. In some embodiments, the host storage resource 136 is coupled to and/or in direct communication with the host computing device 101. The host storage resource 136 may, for example, comprise a solid-state storage device coupled to an internal I/O bus of the host computing device 101. The I/O requests 116 may be serviced by use of an interim storage module 122, as disclosed herein. The interim storage module 122 may be configured to store the data in a scratch storage 138. Step 920 may comprise a) writing data of the I/O request 116 to the scratch storage 138 and b) recording that data of the I/O request 116 can be removed in response to a removal condition and/or trigger, such as a VM reboot, cycle, and/or the like. Step 920 may further comprise acknowledging completion of the I/O request 116 without accessing the corresponding primary storage resource 160 (e.g., without writing the data through and/or back to the primary storage resource 160).

The scratch storage 138 of step 920 may be used to service transient I/O requests 116 of a plurality of different VMs 114A-N operating on the host computing device 101. Step 920 may, therefore, further comprise allocating storage capacity to the VMs 114A-N within the scratch storage 138 by use of the provisioner 132. The provisioner 132 may allocate capacity in accordance with I/O requirements of the VMs 114A-N (e.g., QoS requirements of one or more of the VMs 114A-N, I/O load, and/or the like). I/O requests 116 that cannot be serviced by use of the capacity allocated to the VM 114A-N may be redirected to the primary storage resource 160, as disclosed herein, which may comprise a designated virtual disk 171A-N (and/or disposable volume) managed by the virtualization infrastructure 110. Step 920 may further comprise retaining ephemeral data of a VM 114A-N in response to determining that the VM 114A-N is to relocate to another host computing device, and/or transferring ephemeral data of the VM 114A-N to the other host, as disclosed herein.

Figure 10:
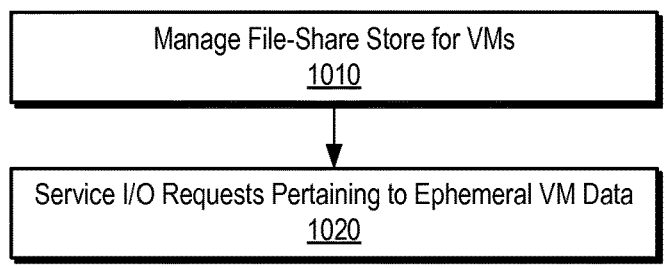
FIG. 10 is a flow diagram of another embodiment of a method for managing virtualized I/O.

FIG. 10 is a flow diagram of another embodiment of a method 1000 for managing virtualized I/O. Step 1010 may comprise managing a file-share storage 538 comprising file data common to two or more VMs 114A-N. Step 1010 may comprise a FSM 522 indexing context-independent identifiers (DID 556) to file data stored in the file-share storage 538. The file-share storage 538 may comprise a storage resource that is local to (and/or closely coupled to) the host computing device 101. Step 1010 may further comprise providing access to file data in the file-share storage 538 to two or more of the VMs 114A-N.

Step 1020 may comprise servicing I/O requests 116 pertaining to ephemeral data of the VMs 114A-N by use of, inter alia, interim storage of the host computing device 101 (e.g., scratch storage 138 on the host storage resource 136). Step 1020 may comprise monitoring I/O requests 115 of VMs 114A-N in an I/O stack 106 of the host computing device 101, identifying ephemeral I/O requests 116, and servicing the identified ephemeral I/O requests 116. The ephemeral I/O requests 116 may be directed to respective storage resource(s) (e.g., primary storage resource 160, 164, and/or 165, and/or volume 162, 166, and/or 167). Step 1020 may comprise redirecting the ephemeral I/O requests 116 to the scratch storage 138 (by use of the interim storage module 122). Step 1020 may further comprise marking ephemeral data of the VMs 114A-N for removal from the host storage resource 136 in response to a VM reboot, shutdown, and/or the like.

Figure 11:
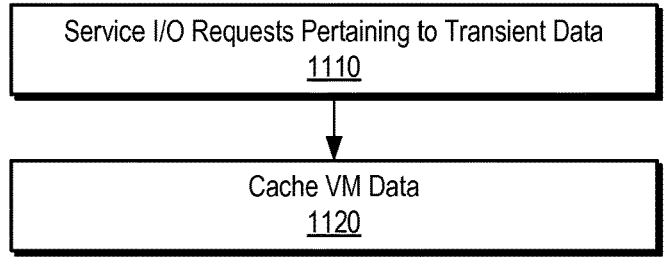
FIG. 11 is a flow diagram of another embodiment of a method for managing virtualized I/O.

FIG. 11 is a flow diagram of another embodiment of a method 1100 for managing virtualized I/O. Step 1110 may comprise servicing I/O requests 116 pertaining to ephemeral data of a plurality of VMs 114A-N operating within a virtualization infrastructure 110 of a host computing device 101, as disclosed herein.

Step 1120 may comprise caching non-ephemeral data of the VMs 114A-N on the host storage resource 136 by use of a CMS 180. Step 1120 may comprise monitoring I/O requests by use of a VM I/O monitor 121, and servicing non-ephemeral I/O requests 115 using the CMS 180 (e.g., redirecting the IO requests 115 to the CMS 180), as disclosed herein.

Figure 12:
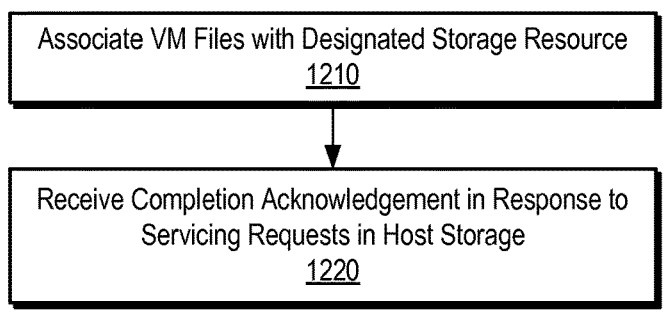
FIG. 12 is a flow diagram of another embodiment of a method for managing virtualized I/O.

FIG. 12 is a flow diagram of another embodiment of a method 1200 for managing virtualized I/O. Step 1210 may comprise associating ephemeral files of a VM 114A-N with a designated storage resource (e.g., a designated virtual disk 171A-N, virtual volume, and/or the like). Step 1210 may comprise modifying one or more of a path, disk, volume, and/or the like, of one or more files. The designated storage resource may correspond to a storage device, volume, and/or path managed by the host computing device 101 (e.g., managed by the virtualization infrastructure 110). In some embodiments, step 1210 comprises executing a script within the VM 114A-N (e.g., by use of the redirection module 126), as disclosed herein.

Step 1220 may comprise issuing I/O requests pertaining to the ephemeral files to the designated storage resource(s) of step 1210. Step 1220 may further comprise receiving a completion acknowledgement to the I/O requests in response to the I/O requests being serviced by use of ephemeral storage of the host computing device 101. The ephemeral storage may be separate from and/or independent of the storage resources associated with the designated storage resource, as disclosed herein.

Reference throughout this specification to features, advantages, or similar language does not imply that all of the features and advantages that may be realized are included in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but does not necessarily, refer to the same embodiment.

Furthermore, the features, advantages, and characteristics described herein may be combined in any suitable manner in one or more embodiments. One skilled in the relevant art will recognize that the disclosed embodiments may be practiced without one or more of the specific features or advantages of a particular embodiment. In other instances, additional features and advantages may be recognized in certain embodiments that may not be present in all embodiments. These features and advantages of the disclosed embodiments will become more fully apparent from the preceding description and appended claims, or may be learned by the practice of the embodiments as set forth herein.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic devices, programmable logic devices, or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer-readable media.

Reference throughout this specification to "one embodiment," "an embodiment," or similar language means that a particular feature, structure, or characteristic described in connection with the embodiment is included in at least one embodiment. Thus, appearances of the phrases "in one embodiment" and "in an embodiment" and similar language throughout this specification may, but do not necessarily, all refer to the same embodiment.

Reference to a computer-readable medium may take any form capable of storing machine-readable instructions on a digital processing apparatus. A computer-readable medium may be embodied by a compact disk, a digital-video disk, a magnetic tape, a Bernoulli drive, a magnetic disk, a punch card, flash memory, integrated circuits, or other digital processing apparatus memory devices.

Furthermore, the features, structures, or characteristics disclosed herein may be combined in any suitable manner in one or more embodiments. In the preceding description, numerous specific details are provided, such as examples of programming, software modules, user selections, network transactions, database queries, database structures, hardware modules, hardware circuits, and hardware chips, to provide a thorough understanding of the disclosed embodiments. One skilled in the relevant art will recognize, however, that the teachings of the disclosure may be practiced without one or more of the specific details, or with other methods, components, materials, and so forth. In other instances, well-known structures, materials, or operations are not shown or described in detail to avoid obscuring aspects of the disclosed embodiments.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

We claim:

1. A method, comprising:
modifying a file reference of a virtual machine, the virtual machine configured to map the file reference to a first storage volume, wherein modifying the file reference comprises:
   remapping the file reference from the first storage volume to a second storage volume within the virtual machine, the remapping to reconfigure the virtual machine to direct requests pertaining to the file reference to the second storage volume,
   wherein the second storage volume corresponds to a virtual disk, the virtual disk associated with a storage resource managed by a hypervisor of the virtual machine operating on a host computing device;
receiving write requests directed to the second storage volume; and
servicing the received write requests by use of local storage of the host computing device, the local storage separate from the storage resource managed by the hypervisor, wherein:
   servicing the received write requests comprises storing file data pertaining to the file reference within the local storage and removing the stored file data from the local storage without accessing the storage resource managed by the hypervisor, such that the file data are not stored within the storage resource; and
   the file data are removed from the local storage in response to detecting a deactivation of the virtual machine.

2. The method of claim 1, wherein removing the stored file data pertaining to the file reference comprises recording that a storage capacity of the local storage in use to store the data pertaining to the file reference is recoverable.

3. The method of claim 1, wherein detecting the deactivation of the virtual machine comprises one or more of detecting a shutdown of the virtual machine, detecting a reboot of the virtual machine, detecting hibernation of the virtual machine, and detecting removal of the virtual machine from the host computing device.

4. The method of claim 1, wherein the second storage volume represents a storage capacity that exceeds a storage capacity provisioned to the virtual machine in the local storage resource of the host computing device, the method further comprising:
servicing a write request of the virtual machine using the storage resource managed by the hypervisor in response to filling the storage capacity provisioned to the virtual machine in the local storage resource.

5. The method of claim 1, further comprising configuring the second storage volume such that the second storage volume corresponds to an empty storage volume.

6. The method of claim 1, further comprising deallocating storage capacity provisioned to the virtual machine in the local storage resource in response to determining that the virtual machine is not running on the host computing device.

7. The method of claim 1, wherein:
the local storage resource corresponds to a disposable disk; and
the disposable disk is reinitialized in response to detecting the deactivation of the virtual machine.

8. The method of claim 1, further comprising:
transferring a portion of the file data pertaining to the file reference stored in the local storage resource to another host computing device in response to determining that the virtual machine is being migrated from the host computing device.

9. The method of claim 1, further comprising transferring data pertaining to the file reference from the storage resource to the virtual storage managed by the hypervisor in response to determining that the virtual machine is being transferred from the host computing device.

10. An apparatus, comprising:
a file redirector configured to detect an ephemeral file within a virtual machine, wherein the ephemeral file is mapped to a particular storage volume such that the virtual machine is configured to issue storage requests pertaining to the ephemeral file to the particular storage volume, and wherein, in response to detecting the ephemeral file, the file redirector is further configured to:
   remap the ephemeral file from the particular storage volume to a designated storage volume, the ephemeral file being remapped to reconfigure the virtual machine to issue storage requests pertaining to the ephemeral file to the designated storage volume; and
an interim storage controller configured to identify storage requests issued to the designated storage volume by the virtual machine and to implement the identified storage requests by use of temporary storage, the temporary storage separate from virtualized storage managed by a host of the virtual machine, wherein, to implement the identified storage requests, the interim storage controller is further configured to:
   cache data of the ephemeral file within the temporary storage, and
   evict the data of the ephemeral file from the temporary storage in response to detecting one or more of a shutdown and a restart of the virtual machine, without writing the data of the ephemeral file to the virtualized storage, such that servicing the identified storage requests comprises caching the data of the ephemeral file in the temporary storage and evicting the data of the ephemeral file from the temporary storage without accessing the virtualized storage, such that the data of the ephemeral file are not written to the virtualized storage.

11. The apparatus of claim 10, wherein the file redirector is configured to modify a path of the ephemeral file within the virtual machine.

12. An apparatus, comprising:
a file redirection manager configured to modify a file reference of a virtual machine, the virtual machine configured for operation within a virtualization environment of a host computing system, wherein:
   the virtual machine maps the file reference to an original storage volume,
   modifying the file reference comprises remapping the file reference to a designated storage volume, different from the original storage volume, and
   the original storage volume and the designated storage volume are associated with respective virtualized storage volumes of the virtualization environment; and
an interim storage controller configured to identify storage requests that are directed to the designated storage volume, and to service the identified storage requests by use of a scratch storage, wherein the scratch storage is separate from storage devices corresponding to the virtualized storage volumes of the virtualization environment, and wherein, to service the identified storage requests, the interim storage controller is further configured to:
  store data pertaining to the file reference exclusively within the scratch storage such that the data pertaining to the file reference are not written to the storage devices corresponding to the virtualized storage volumes, and
  automatically remove the data pertaining to the file reference from the scratch storage such that the data pertaining to the file reference are stored within the scratch storage and are automatically removed from the scratch storage without accessing the storage devices corresponding to the virtualized storage volumes of the virtualization environments;
  wherein the interim storage controller is configured to remove the data pertaining to the file reference from the scratch storage in response to one or more of a reboot, a shutdown, and a hibernation of the virtual machine.

13. The apparatus of claim 12, wherein the interim storage controller is configured to remove the data pertaining to the file reference from the scratch storage by marking the data pertaining to the file reference stored within the scratch storage as invalid.

14. The apparatus of claim 12, further comprising a driver configured to identify the storage requests that are directed to the designated storage volume in a storage stack of the host computing system.

15. The apparatus of claim 12, wherein the file redirection manager comprises a script configured for execution within the virtual machine.

16. The apparatus of claim 12, further comprising a virtual machine transfer manager configured to preserve the data pertaining to the file reference by one or more of: a) providing the data pertaining to the file reference of the virtual machine to another host computing system and b) moving the data pertaining to the file reference of the virtual machine to a persistent storage device.

17. The apparatus of claim 12, wherein the host computing system is configurable to host a plurality of virtual machines, the apparatus further comprising a data share controller configured to provide access to two or more of the virtual machines to duplicate data common to the two or more of the virtual machines.

18. The apparatus of claim 17, wherein the data share controller is further configured to, in response to receiving a request comprising a signature from a virtual machine:
  index the duplicate data to the signature of the duplicate data; and
  provide access to the duplicate data to the virtual machine.

19. The apparatus of claim 18, wherein the two or more virtual machines are configured to maintain respective persistent dictionaries that associate a file name pertaining to the duplicate data with the signature of the duplicate data.

20. A system, comprising:
  a share module configured to provide access to stored file data to two or more virtual machines of a plurality of virtual machines operating on a virtual machine host, the virtual machine host managing virtual disks for the virtual machines, the virtual disks associated with respective storage volumes managed by the virtual machine host;
  an ephemeral storage module configured to service input/output (I/O) requests directed to a designated virtual disk of the virtual disks managed by the virtual machine host without accessing the storage volumes,
  wherein, to service particular I/O requests directed to the designated virtual disk by a particular virtual machine, the ephemeral storage module is further configured to:
    admit data of the particular I/O requests into cache storage, the cache storage separate from the storage volumes,
    detect deactivation of the particular virtual machine, and
    evict the data of the particular I/O requests from the cache storage, such that the particular I/O requests are serviced without accessing any of the storage volumes and the data of the particular I/O requests are not written to any of the storage volumes; and
  a redirection module configured to modify references to one or more files of the virtual machines to cause the virtual machines to direct I/O requests pertaining to the one or more files to the designated virtual disk, wherein modifying a reference to a file of the particular virtual machine comprises remapping the reference from an original virtual disk to the designated virtual disk, the remapping to reconfigure the particular virtual machine to direct I/O requests pertaining to the file to the designated virtual disk.

21. The system of claim 20, further comprising:
an I/O filter configured to identify I/O requests pertaining to the stored file data common to the two or more virtual machines; and
a virtual machine monitor configured to detect the deactivation of the virtual machine in response to one or more of a shutdown of the particular virtual machine, a restart of the particular virtual machine, a hibernation of the particular virtual machine, and a boot cycle of the particular virtual machine.

* * * * *